(12) United States Patent
Park et al.

(10) Patent No.: US 10,374,839 B2
(45) Date of Patent: Aug. 6, 2019

(54) OPERATION METHOD OF USER EQUIPMENT IN RELATION TO CSI-RS IN WIRELESS COMMUNICATION SYSTEM AND APPARATUS SUPPORTING THE SAME

(71) Applicant: LG ELECTRONICS INC., Seoul (KR)

(72) Inventors: Jonghyun Park, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/744,673

(22) PCT Filed: Aug. 10, 2016

(86) PCT No.: PCT/KR2016/008792
§ 371 (c)(1),
(2) Date: Jan. 12, 2018

(87) PCT Pub. No.: WO2017/026794
PCT Pub. Date: Feb. 16, 2017

(65) Prior Publication Data
US 2018/0212800 A1 Jul. 26, 2018

Related U.S. Application Data

(60) Provisional application No. 62/204,968, filed on Aug. 13, 2015.

(51) Int. Cl.
*H04W 72/04* (2009.01)
*H04L 5/00* (2006.01)
(Continued)

(52) U.S. Cl.
CPC ..... *H04L 25/03006* (2013.01); *H04B 7/0626* (2013.01); *H04L 1/00* (2013.01);
(Continued)

(58) Field of Classification Search
CPC ... H04L 25/03006; H04L 5/0057; H04L 1/00; H04L 2025/03783; H04B 7/0626; H04B 7/06; H04B 7/0617
See application file for complete search history.

(56) References Cited

U.S. PATENT DOCUMENTS

2013/0003788 A1* 1/2013 Marinier ............... H04B 7/024
375/219
2013/0336214 A1 12/2013 Sayana et al.
(Continued)

FOREIGN PATENT DOCUMENTS

| KR | 10-2015-0035555 A | 4/2015 |
| KR | 10-2015-0058175 A | 5/2015 |
| WO | 2014/051356 A1 | 4/2014 |

OTHER PUBLICATIONS

LG Electronics, "Discussion on specification impacts for beamformed CSI-RS-based schemes", R1-152750, 3GPP TSG RAN WG1 Meeting #81, Fukuoka, Japan, May 25-29, 2015, See section 2.

*Primary Examiner* — Dac V Ha
(74) *Attorney, Agent, or Firm* — Dentons US LLP

(57) ABSTRACT

The present invention provides an operation method of an user equipment in relation to CSI-RS in a wireless communication system.
Particularly, an operation method performed by a user equipment (UE) according to the present disclosure includes receiving a higher layer signaling including resource configuration information related to an aperiodic transmission of beamformed CSI-RS from a base station (BS); receiving a first DCI format including first control information indicating that there is an aperiodic transmission of the beamformed CSI-RS from the BS; measuring the beamformed CSI-RS based on the received resource configuration information; and reporting a measurement result of the beamformed CSI-RS to the BS.

10 Claims, 17 Drawing Sheets

(51) Int. Cl.
*H04L 25/03* (2006.01)
*H04L 1/00* (2006.01)
*H04B 7/06* (2006.01)
*H04L 27/26* (2006.01)

(52) U.S. Cl.
CPC .......... *H04L 5/0057* (2013.01); *H04B 7/0617* (2013.01); *H04L 5/001* (2013.01); *H04L 5/005* (2013.01); *H04L 5/0051* (2013.01); *H04L 5/0053* (2013.01); *H04L 27/2601* (2013.01); *H04L 2025/03783* (2013.01)

(56) References Cited

U.S. PATENT DOCUMENTS

2016/0142123 A1* 5/2016 Zhang .................. H04B 7/0632
 375/267
2016/0359538 A1* 12/2016 Onggosanusi ....... H04B 7/0469

* cited by examiner

【Figure 1】
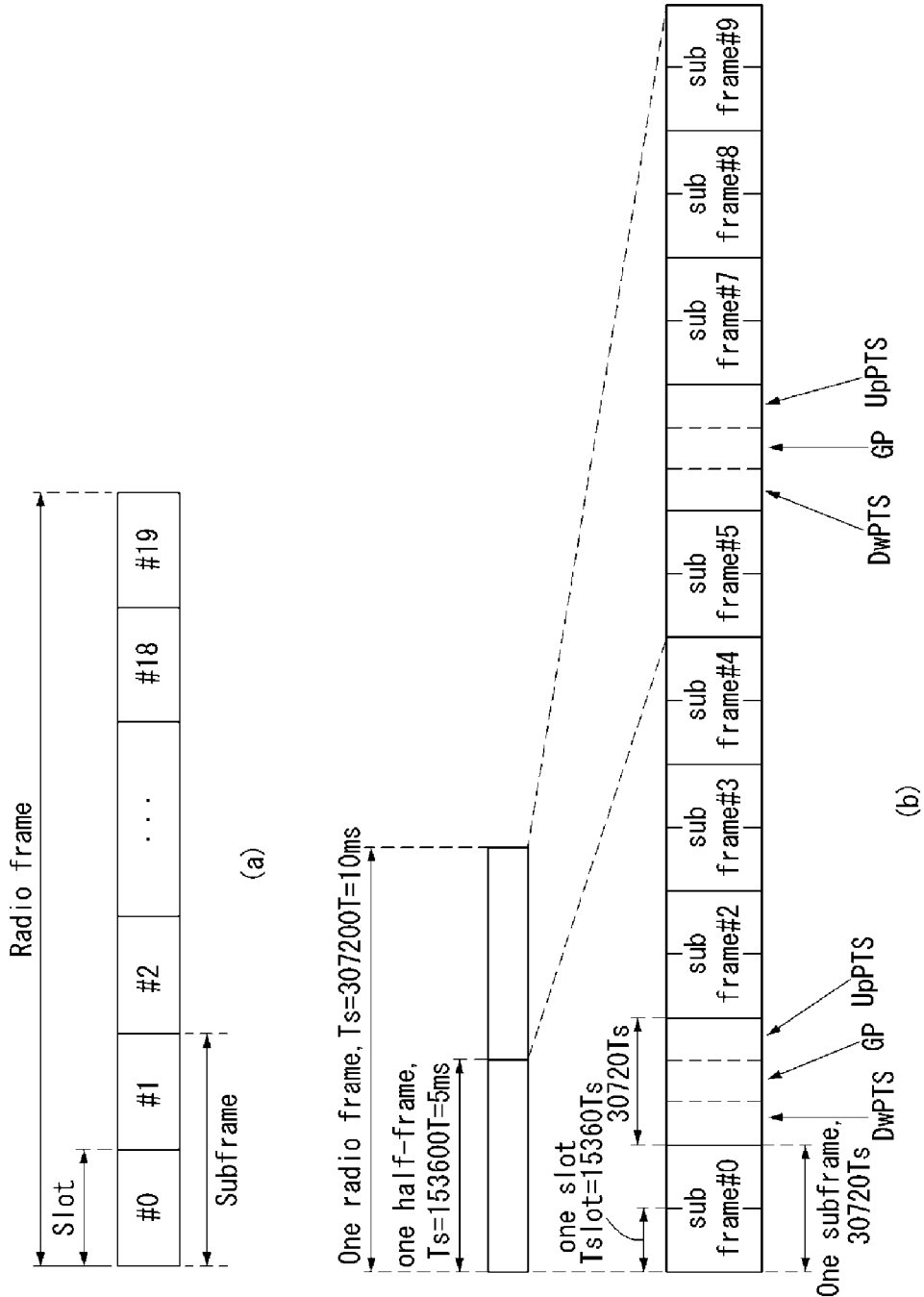

[Figure 2]
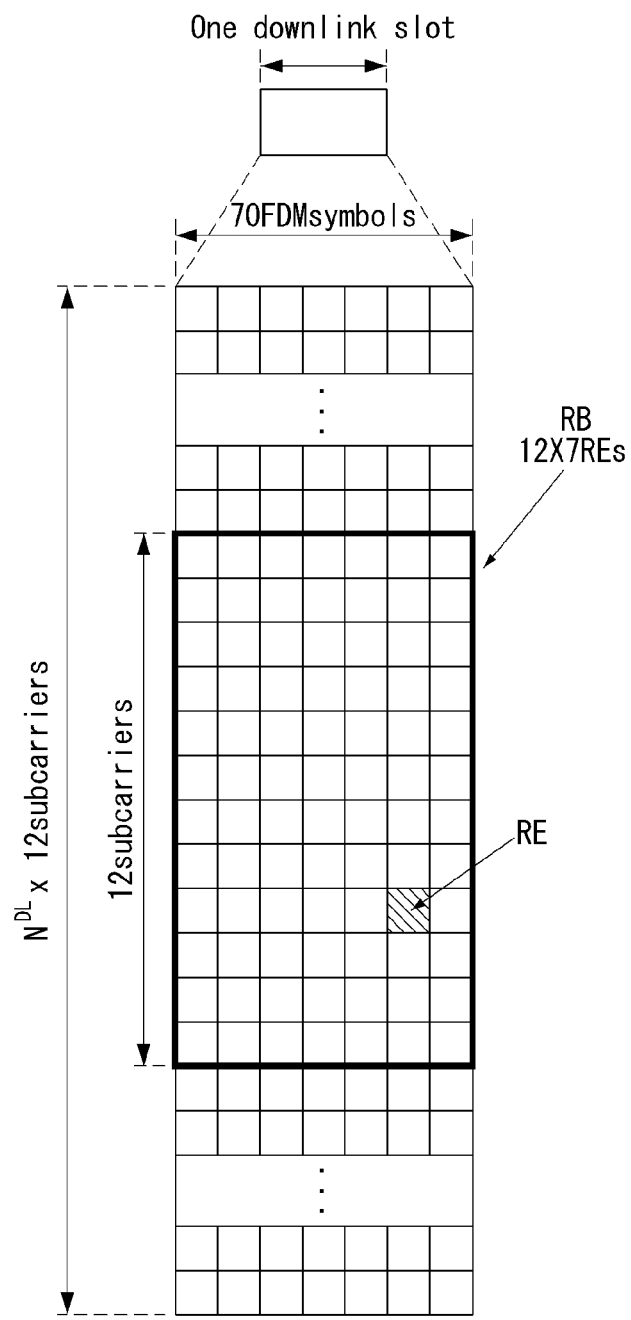

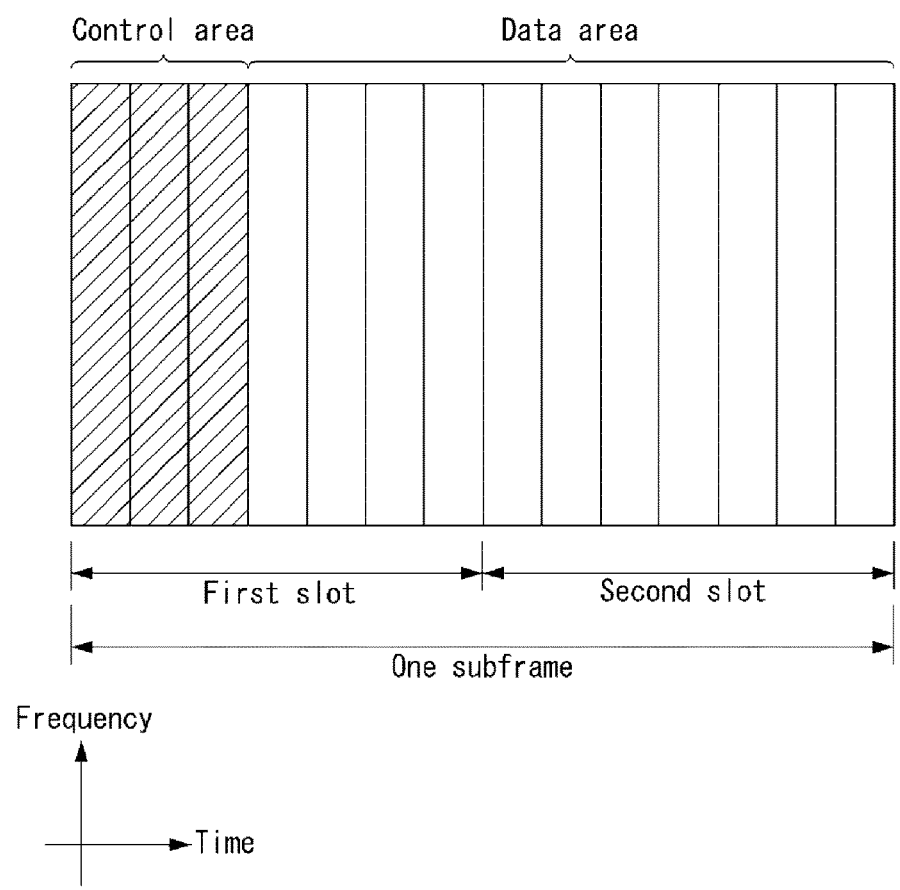

[Figure 4]
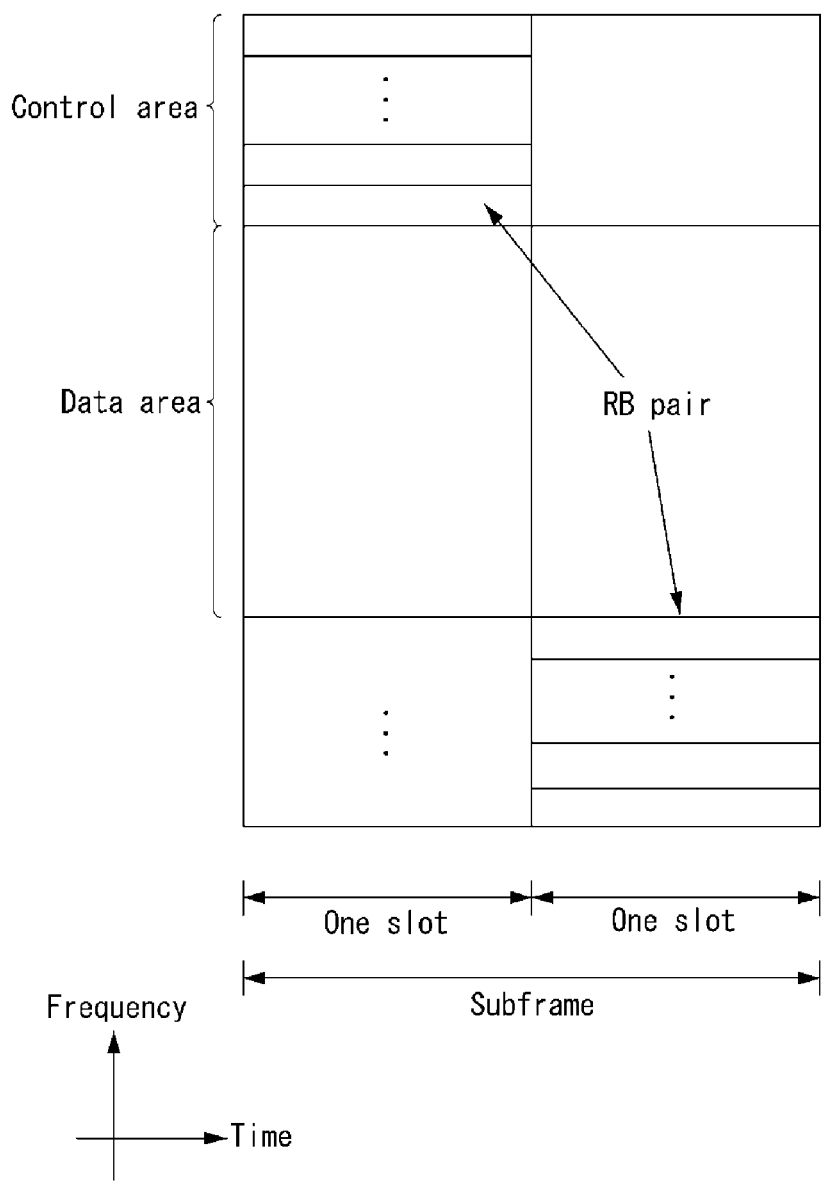

【Figure 5】
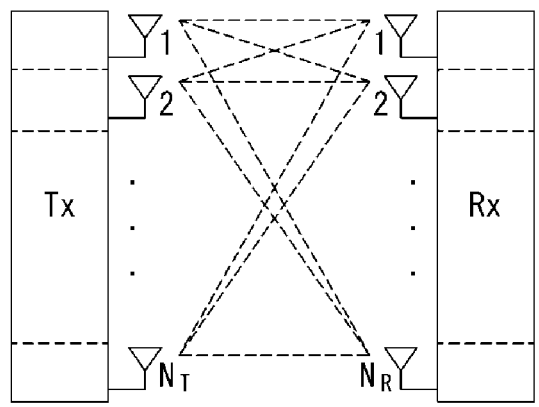
【Figure 6】
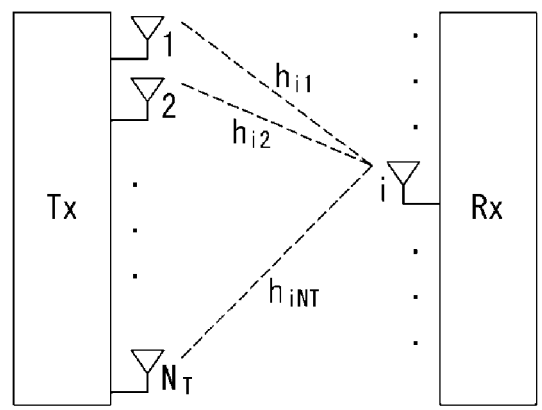

[Figure 7]
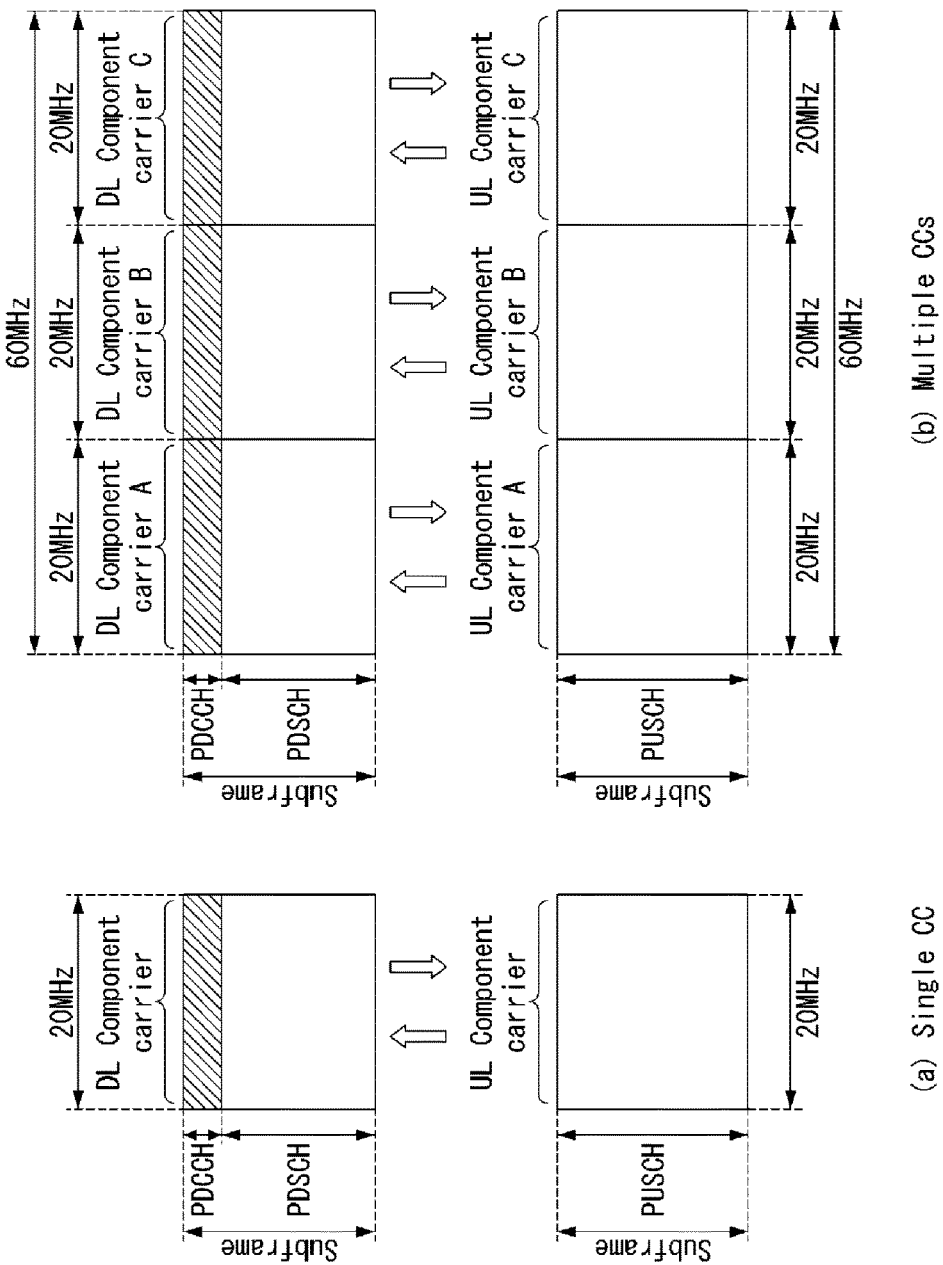

[Figure 8]
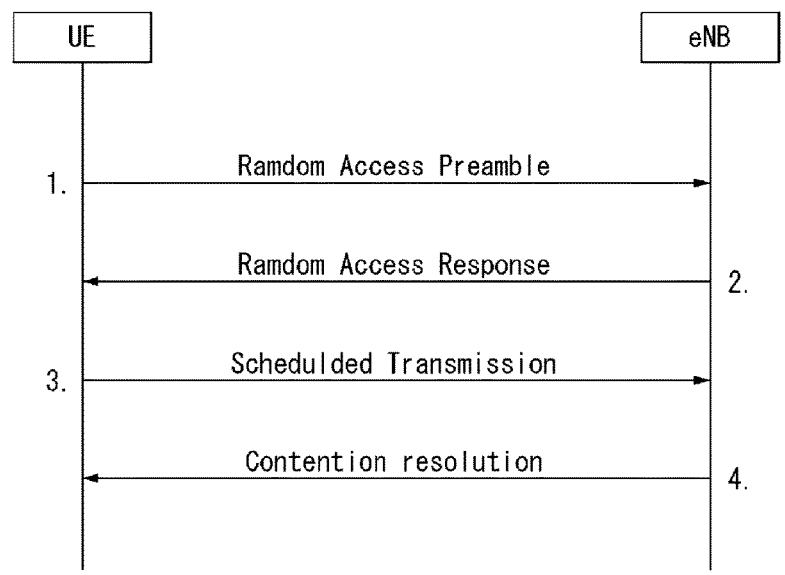

[Figure 9]
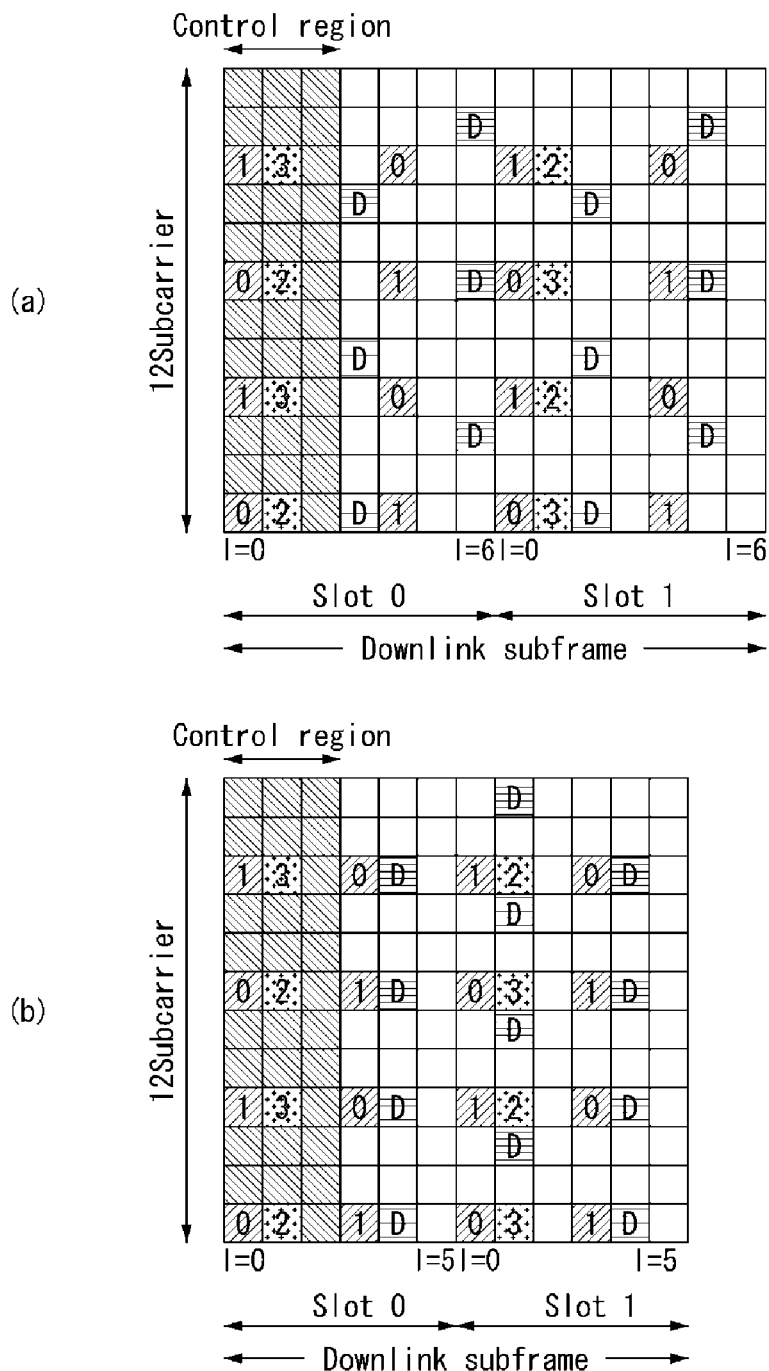

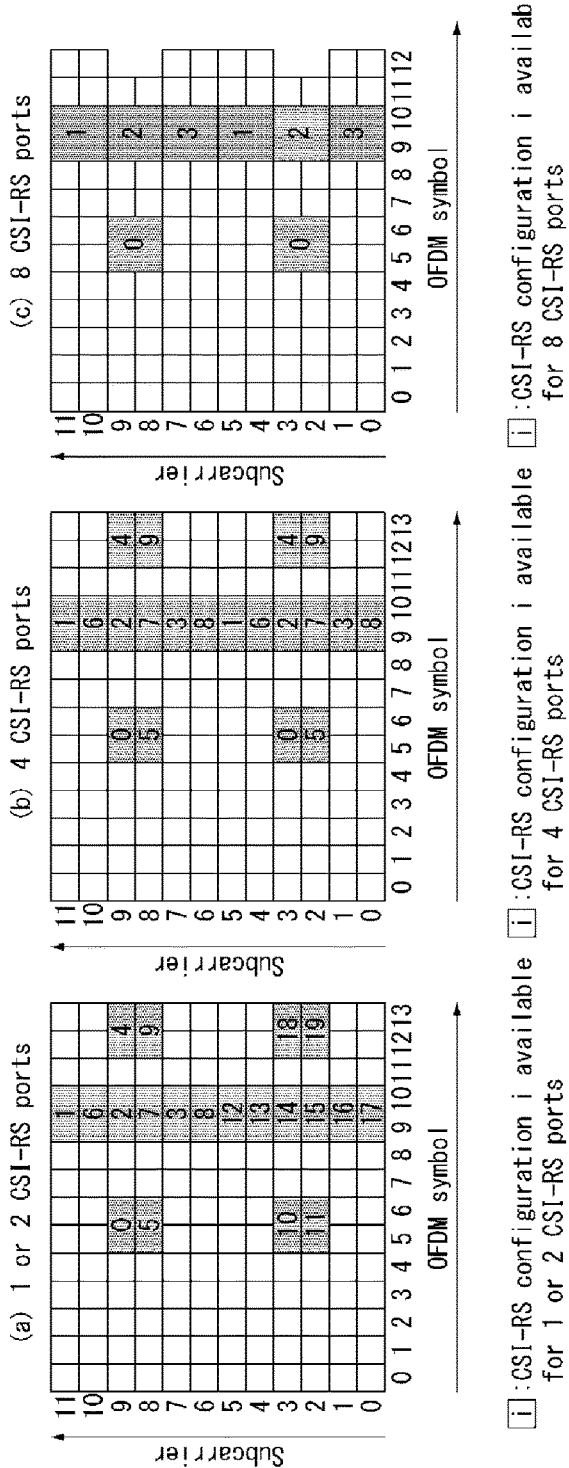
[Figure 10]

[Figure 11]
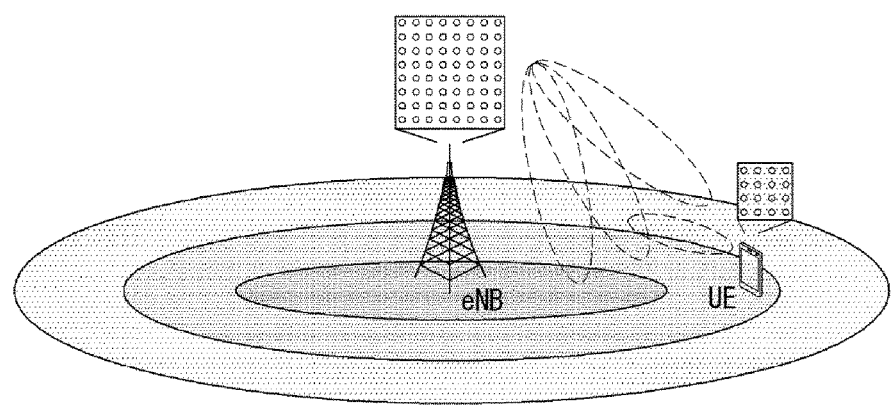

【Figure 12】
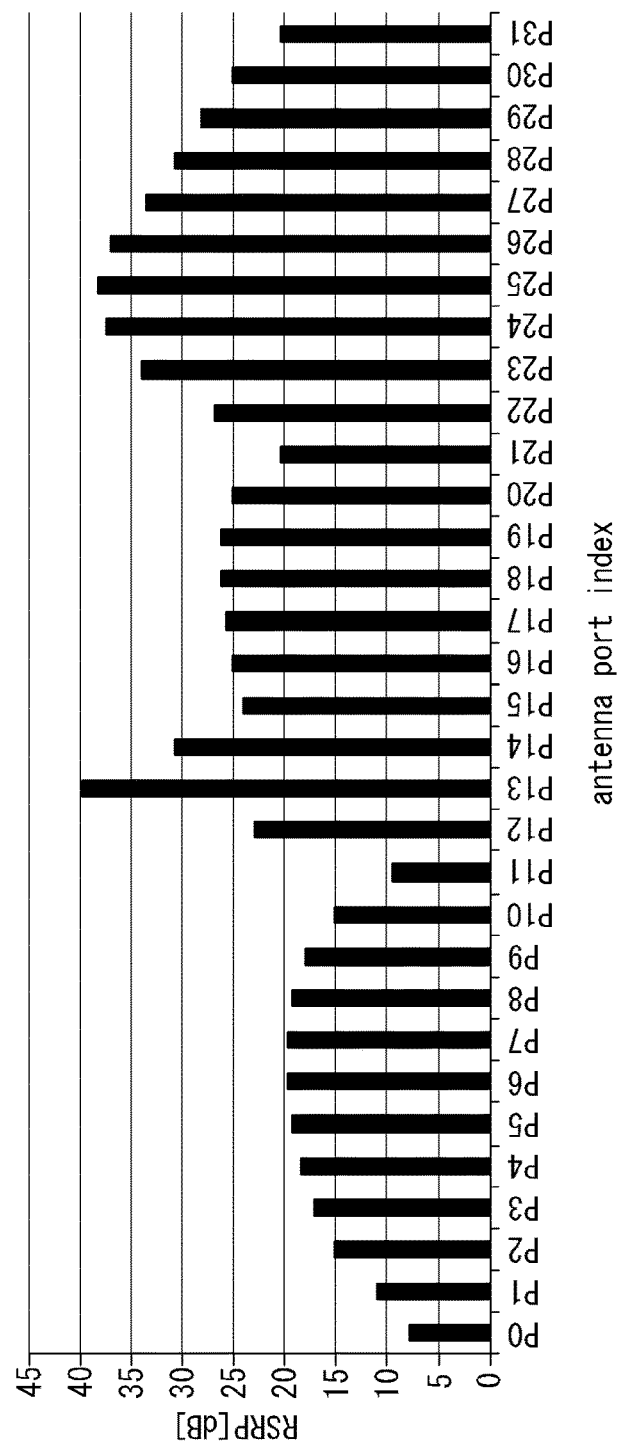

【Figure 13】

| Group index for level 4 grouping | | | | | | | | 0 | | | | | | | | 1 | | | | | | | |
|---|---|---|---|---|---|---|---|---|---|---|---|---|---|---|---|---|---|---|---|---|---|---|---|
| Group index for level 3 grouping | | | | 0 | | | | | | | | 1 | | | | | | | | 2 | | | 3 |
| Group index for level 2 grouping | | 0 | | | 1 | | | 2 | | | 3 | | | 4 | | | 5 | | | 6 | | | 7 | |
| Group index for level 1 grouping | 0 | 1 | 2 | 3 | 4 | 5 | 6 | 7 | 8 | 9 | 10 | 11 | 12 | 13 | 14 | 15 |
| | P0 | P1 | P2 | P3 | P4 | P5 | P6 | P7 | P8 | P9 | P10 | P11 | P12 | P13 | P14 | P15 |

[Figure 14]
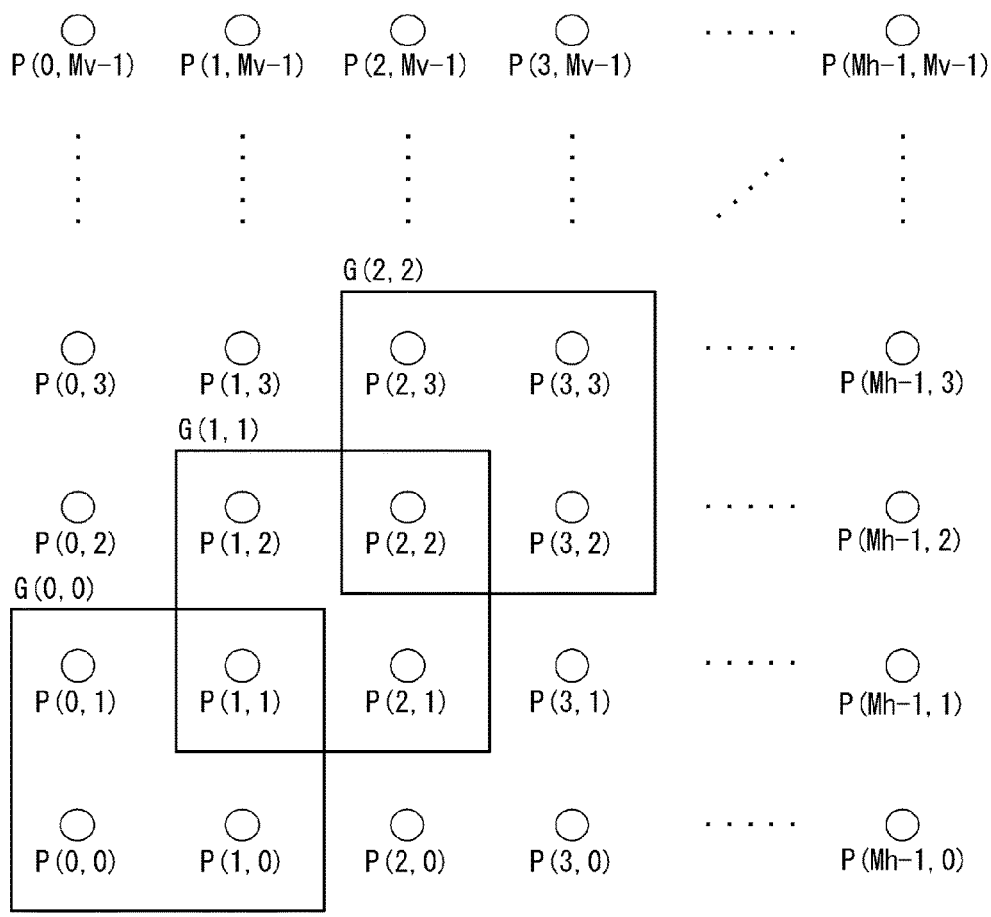

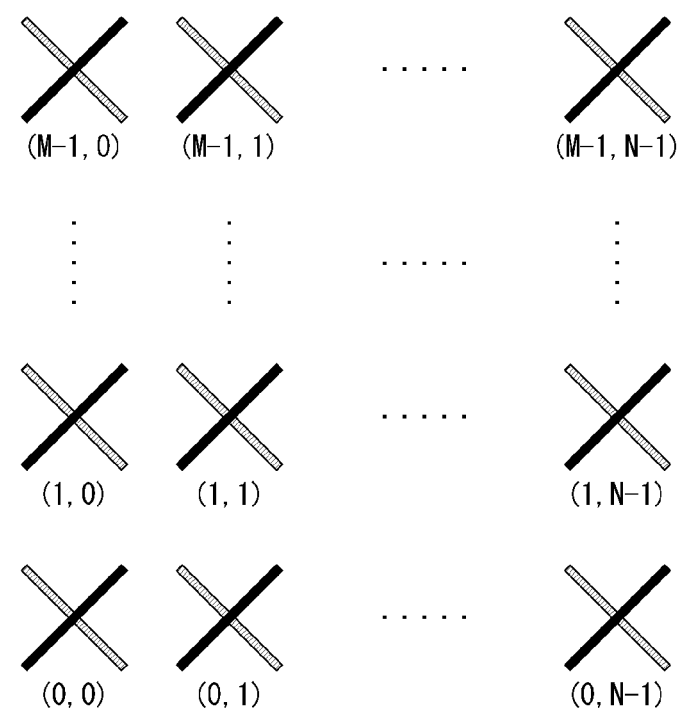
[Figure 15]

【Figure 16】
(a) 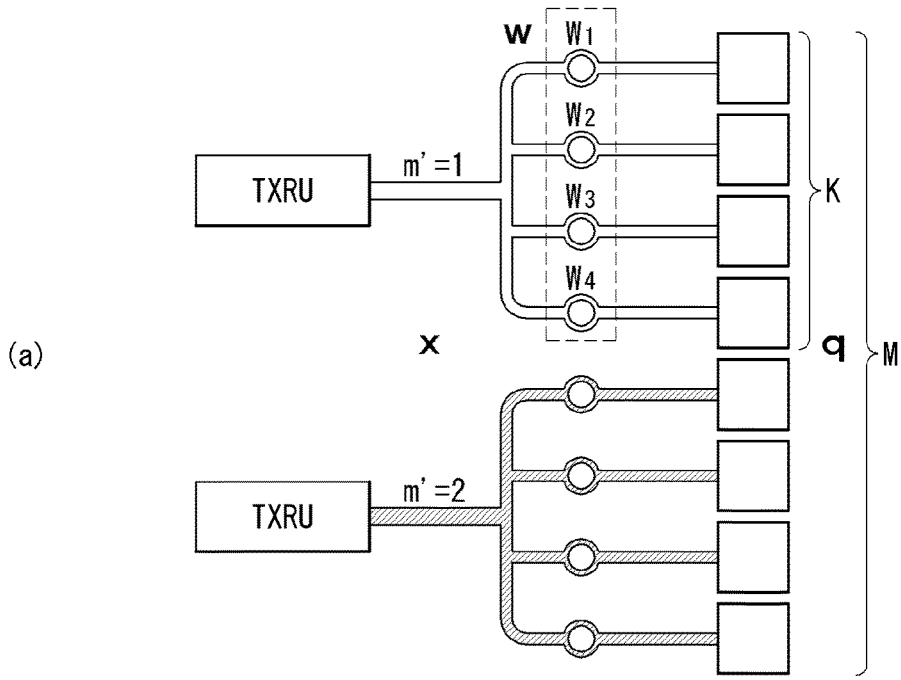
(b) 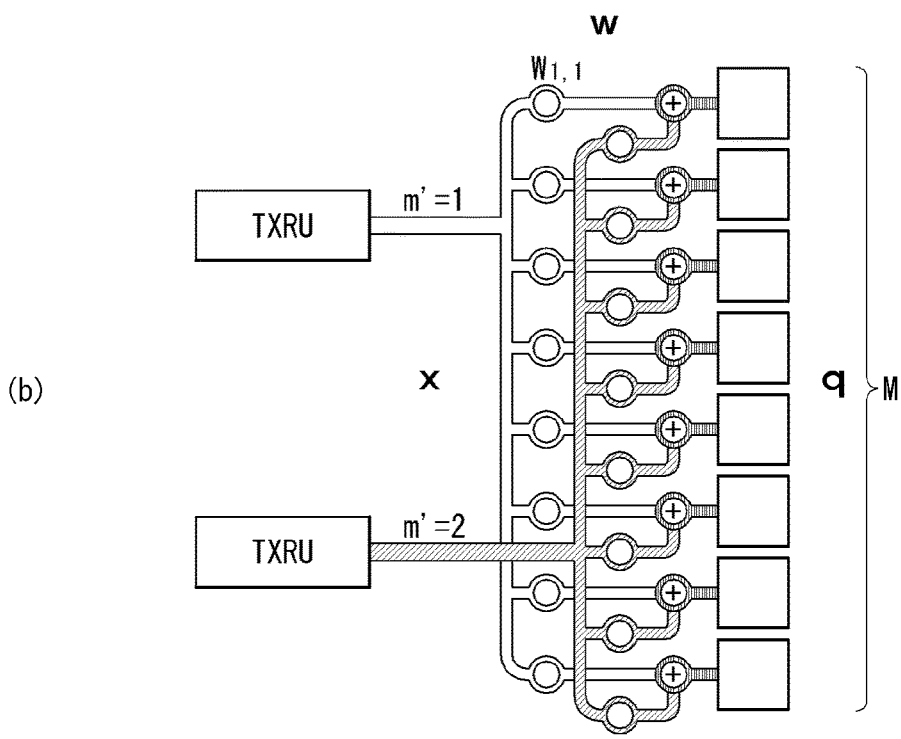

[Figure 17]
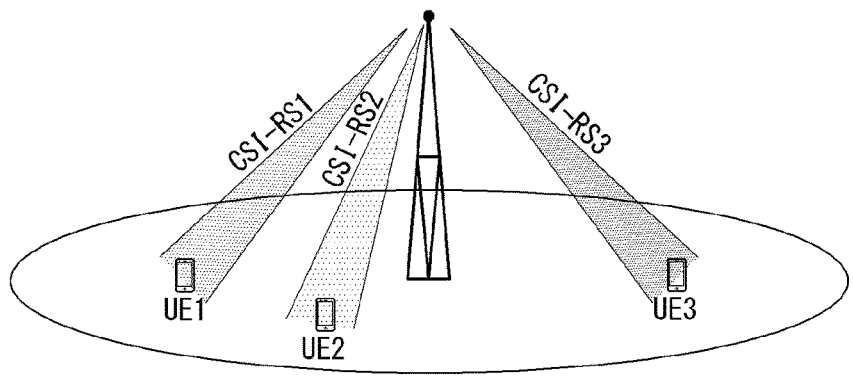
[Figure 18]
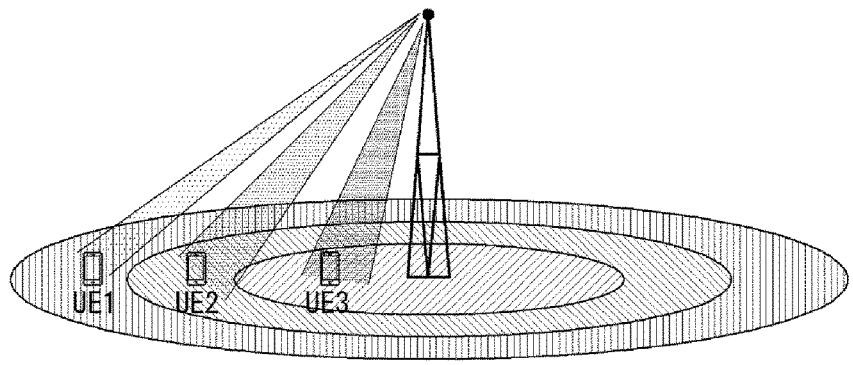
[Figure 19]
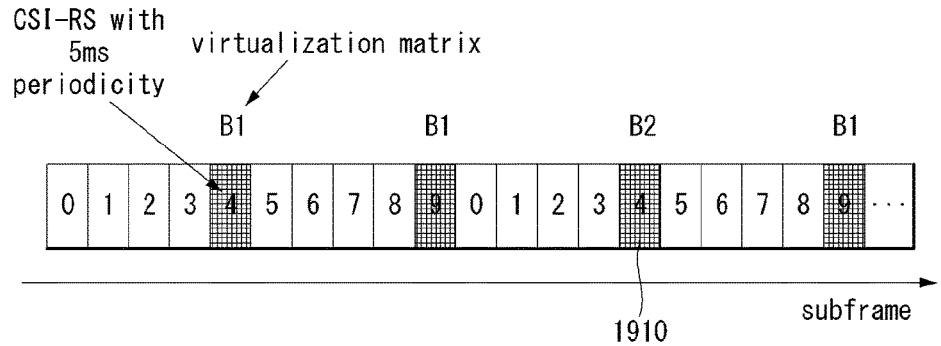

[Figure 20]
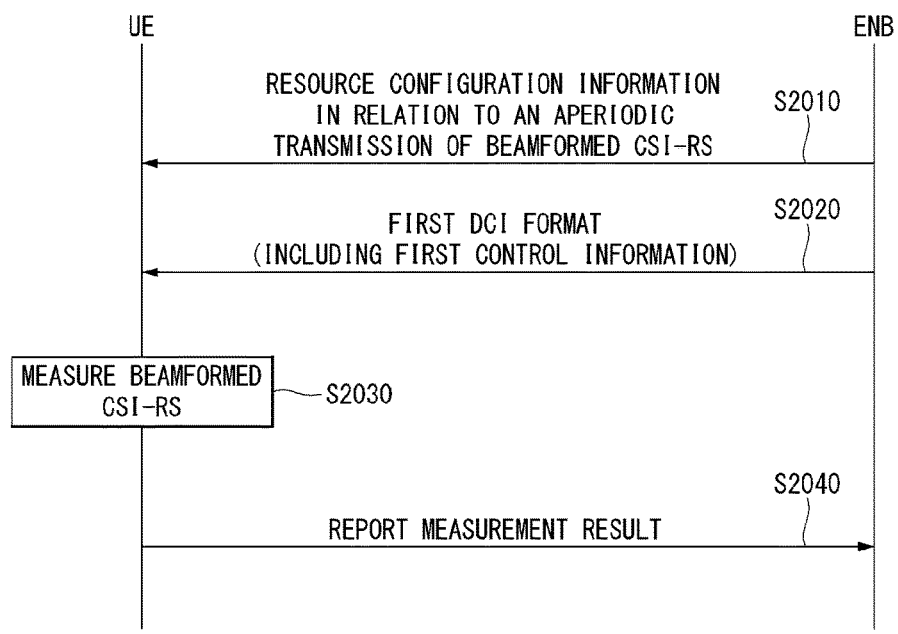
[Figure 21]
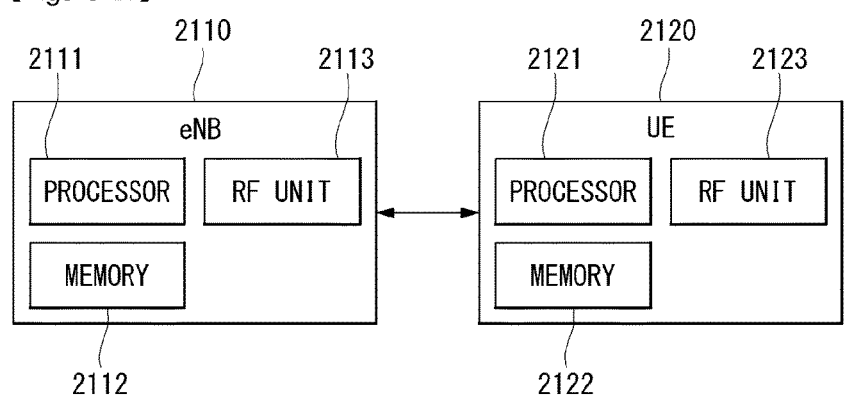

OPERATION METHOD OF USER EQUIPMENT IN RELATION TO CSI-RS IN WIRELESS COMMUNICATION SYSTEM AND APPARATUS SUPPORTING THE SAME

CROSS-REFERENCE TO RELATED APPLICATIONS

This application is a National Stage Application of International Application No. PCT/KR2016/008792, filed on Aug. 10, 2016, which claims the benefit of U.S. Provisional Application No. 62/204,968, filed on Aug. 13, 2015, all of which are hereby incorporated by reference in their entirety for all purposes as if fully set forth herein.

TECHNICAL FIELD

The present invention relates to wireless communication systems, and more particularly, to an operation method of a user equipment in relation to Channel State Information (CSI) based on a reference signal and an apparatus for supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking. The present specification has been made in an effort to provide a method for transmitting/receiving terminal capability information including the maximum number of CSI-RS ports supported by a terminal in a specific CSI reporting type or class.

DISCLOSURE

Technical Problem

An object of the present disclosure is to define various parameters for a transmission of aperiodic beamformed CSI-RS and the procedures therefor.

In addition, another object of the present disclosure is, when aperiodic beamformed CSI-RS is not transmitted, to define dynamic ZP CSI-RS indication for reuse of a PDSCH in a corresponding resource and to provide a method for transmitting it.

The technical objects to attain in the present disclosure are not limited to the above-described technical objects and other technical objects which are not described herein will become apparent to those skilled in the art from the following description.

Technical Solution

An operation method performed by a user equipment (UE) in relation to Channel State Information (CSI)-Reference Signal (RS) in a wireless communication system according to the present disclosure includes receiving a higher layer signaling including resource configuration information in relation to an aperiodic transmission of beamformed CSI-RS from a base station (BS); receiving a first downlink control information (DCI) format including first control information indicating that there is an aperiodic transmission of the beamformed CSI-RS from the BS; measuring the beamformed CSI-RS based on the received resource configuration information; and reporting a measurement result of the beamformed CSI-RS to the BS.

In addition, in the present disclosure, the method further includes receiving a second DCI format including information in relation to Physical Downlink Shared Channel (PDSCH) resource mapping from the BS; and receiving the PDSCH based on the received second DCI format from the BS.

In addition, in the present disclosure, the second DCI format further includes at least one of PDSCH RE Mapping and Quasi-Co-Location Indicator (PQI) field or dynamic Zero Power (ZP) CSI-RS indication field.

In addition, in the present disclosure, the dynamic ZP CSI-RS indication field includes a resource region that is available to be used for PDSCH transmission additionally owing to a situation that an aperiodic transmission of the beamformed CSI-RS does not occur.

In addition, in the present disclosure, when the second DCI format includes either one of the PQI field or the dynamic ZP CSI-RS indication field, the PDSCH resource mapping is performed based on any one field included in the second DCI format.

In addition, in the present disclosure, when the second DCI format includes both of the PQI field and the dynamic ZP CSI-RS indication field, the PDSCH resource mapping is performed based on the dynamic ZP CSI-RS indication field.

In addition, in the present disclosure, the second DCI format is a DCI format in relation to a Transmission Mode (TM) which is defined for supporting a transmission of beamformed CSI-RS.

In addition, in the present disclosure, the first control information is an aperiodic CSI request field.

In addition, in the present disclosure, the dynamic ZP CSI-RS indication field is represented as 2 bits.

In addition, in the present disclosure, the dynamic ZP CSI-RS indication field represents a parameter set configured by higher layer signaling in order to determine PDSCH resource mapping.

In addition, in the present disclosure, the higher layer signaling is Non Zero Power (NZP) CSI-RS configuration information.

In addition, a user equipment (UE) for performing an operation in relation to Channel State Information (CSI)-Reference Signal (RS) in a wireless communication system according to the present disclosure includes a radio frequency (RF) unit for transmitting and receiving a radio signal; and a processor functionally connected to the RF unit, where the processor is configured to perform: receiving a higher layer signaling including resource configuration information in relation to an aperiodic transmission of beamformed CSI-RS from a base station (BS); receiving a first downlink control information (DCI) format including first control information indicating that there is an aperiodic transmission of the beamformed CSI-RS from the BS;

measuring the beamformed CSI-RS based on the received resource configuration information; and reporting a measurement result of the beamformed CSI-RS to the BS.

Technical Effects

According to the present disclosure, an aperiodic beamformed CSI-RS transmission is defined and a terminal measures CSI-RS only in the case that the CSI-RS transmission is triggered, and accordingly, there is an effect of reducing complexity in terminal implementation.

In addition, according to the present disclosure, when aperiodic beamformed CSI-RS is not transmitted, a PDSCH is transmitted in the corresponding resource region, and accordingly, there is an effect of increasing efficiency for resource reuse.

The technical effects obtained in the present invention are not limited to the technical effects described above, and other technical effects not mentioned herein may be understood to those skilled in the art from the description below.

DESCRIPTION OF DRAWINGS

The accompanying drawings included as part of the detailed description in order to help understanding of the present invention provide embodiments of the present invention and describe the technical features of the present invention along with the detailed description.

FIG. 1 shows the structure of a radio frame in a wireless communication system to which an embodiment of the present invention may be applied.

FIG. 2 is a diagram illustrating a resource grid for one downlink slot in the wireless communication system to which the present invention can be applied.

FIG. 3 illustrates a structure of a downlink subframe in the wireless communication system to which the present invention can be applied.

FIG. 4 illustrates a structure of an uplink subframe in the wireless communication system to which the present invention can be applied.

FIG. 5 is a configuration diagram of a general multiple input multiple output (MIMO) communication system.

FIG. 6 is a diagram illustrating a channel from multiple transmitting antennas to one receiving antenna.

FIG. 7 illustrates examples of a component carrier and carrier aggregation in the wireless communication system to which the present invention can be applied.

FIG. 8 is a diagram for illustrating a contention-based random access procedure in a wireless communication system to which an embodiment of the present invention may be applied.

FIG. 9 illustrates a reference signal pattern mapped to a downlink resource block pair in the wireless communication system to which the present invention can be applied.

FIG. 10 is a diagram illustrating the CSI-RS configuration in a wireless communication system to which the present invention may be applied.

FIG. 11 illustrates a system having a plurality of transmission/reception antennas through which an eNB or a UE is capable of three-dimensional (3-D) beamforming based on an AAS in a wireless communication system to which an embodiment of the present invention may be applied.

FIG. 12 illustrates RSRP for each antenna port of an RRM-RS according to an embodiment of the present invention.

FIG. 13 illustrates RRM-RS antenna port grouping levels according to an embodiment of the present invention.

FIG. 14 is a diagram illustrating antenna ports and antenna port groups of RRM-RSs arrayed in 2-D indices according to an embodiment of the present invention.

FIG. 15 is a diagram illustrating one example of a polarization based 2D plane antenna array model.

FIG. 16 is a diagram illustrating one example of a transceiver units (TXRUs) model.

FIG. 17 is a diagram illustrating an example of an operation based on approach 1 proposed in the present disclosure.

FIG. 18 illustrates an example of operations based on approach 2 proposed in the present disclosure.

FIG. 19 is a diagram illustrating an example of approach 3 proposed in the present disclosure.

FIG. 20 is a flowchart illustrating an example of aperiodic transmission and reception method of beamformed CSI-RS proposed in the present disclosure.

FIG. 21 illustrates a block diagram of a wireless communication apparatus according to an embodiment of the present invention.

BEST MODE FOR INVENTION

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General Wireless Communication System to which an Embodiment of the Present Invention May be Applied FIG. 1 shows the structure of a radio frame in a wireless communication system to which an embodiment of the present invention may be applied.

3GPP LTE/LTE-A support a type 1 radio frame structure capable of being applied to frequency division duplex (FDD) and a type 2 radio frame structure capable of being applied to time division duplex (TDD).

In FIG. 1, the size of the radio frame in a time domain is expressed in a multiple of a time unit "T_s=1/(15000*2048)." Downlink and uplink transmission includes a radio frame having an interval of T_f=307200*T_s=10 ms.

FIG. 1(a) illustrates the type 1 radio frame structure. The type 1 radio frame may be applied to both full duplex FDD and half duplex FDD.

The radio frame includes 10 subframes. One radio frame includes 20 slots each having a length of T_slot=15360*T_s=0.5 ms. Indices 0 to 19 are assigned to the respective slots. One subframe includes two contiguous slots in the time domain, and a subframe i includes a slot 2i and a slot 2i+1. The time taken to send one subframe is called a transmission time interval (TTI). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink. The OFDM symbol may also be called an SC-FDMA symbol or a symbol period. The resource block is a resource allocation unit and includes a plurality of contiguous subcarriers in one slot.

FIG. 1(b) shows the type 2 radio frame structure.

The type 2 radio frame structure includes 2 half frames each having a length of 153600*T_s=5 ms. Each of the half frames includes 5 subframes each having a length of 30720*T_s=1 ms.

In the type 2 radio frame structure of a TDD system, an uplink-downlink configuration is a rule showing how uplink and downlink are allocated (or reserved) with respect to all of subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio time.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot 2i and the slot 2i+1 each having "T_slot=15360*T_s=0.5 ms."

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, the special subframe S is present only in the first half frame.

In all of the seven configurations, No. 0 and No. 5 subframes and DwPTSs are an interval for only downlink transmission. The UpPTSs, the subframes, and a subframe subsequent to the subframes are always an interval for uplink transmission.

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information. Like scheduling information, the configuration information may be transmitted through a physical downlink control channel (PDCCH) and may be transmitted to all of UEs within a cell in common through a broadcast channel as broadcast information.

Table 2 shows a configuration (i.e., the length of a DwPTS/GP/UpPTS) of the special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of the radio frame according to the example of FIG. 1 is only one example. The number of subcarriers included in one radio frame, the number of slots included in one subframe, and the number of OFDM symbols included in one slot may be changed in various manners.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

The enhanced PDCCH (EPDCCH) carries UE-specific signaling. The EPDCCH is located in a physical resource block (PRB) that is set to be UE specific. In other words, as described above, the PDCCH can be transmitted in up to three OFDM symbols in the first slot in the subframe, but the EPDCCH can be transmitted in the resource region other than the PDCCH. The time (i.e., symbol) at which the EPDCCH in the subframe starts can be set in the UE through higher layer signaling (e.g., RRC signaling, etc.).

The EPDCCH is a resource allocation (DL) associated with the DL-SCH related to the transport format, resource allocation and HARQ information, transmission format associated with the UL-SCH, resource allocation and HARQ information, SL-SCH (Sidelink Shared Channel), and PSCCH Information, and so on. Multiple EPDCCHs may be supported and the UE may monitor the set of EPCCHs.

The EPDCCH can be transmitted using one or more successive advanced CCEs (ECCEs), and the number of ECCEs per EPDCCH can be determined for each EPDCCH format.

Each ECCE can be composed of a plurality of enhanced resource element groups (EREGs). EREG is used to define the mapping of ECCEs to REs. There are 16 EREGs per PRB pair. All REs are numbered from 0 to 15 in the order in which the frequency increases, except for the RE carrying the DMRS in each PRB pair.

The UE can monitor a plurality of EPDCCHs. For example, one or two EPDCCH sets may be set in one PRB pair in which the UE monitors the EPDCCH transmission.

A different coding rate for the EPCCH can be realized by merging different numbers of ECCEs. The EPCCH may use localized transmission or distributed transmission so that the mapping of the ECCE to the RE in the PRB may vary.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Multi-Input Multi-Output (MIMO)

An MIMO technology uses multiple transmitting (Tx) antennas and multiple receiving (Rx) antennas by breaking from generally one transmitting antenna and one receiving antenna up to now. In other words, the MIMO technology is a technology for achieving capacity increment or capability enhancement by using a multiple input multiple output antenna at a transmitter side or a receiver side of the wireless communication system. Hereinafter, "MIMO" will be referred to as "multiple input multiple output antenna".

More specifically, the MIMO technology does not depend on one antenna path in order to receive one total message and completes total data by collecting a plurality of data pieces received through multiple antennas. Consequently, the MIMO technology may increase a data transfer rate within in a specific system range and further, increase the system range through a specific data transfer rate.

In next-generation mobile communication, since a still higher data transfer rate than the existing mobile communication is required, it is anticipated that an efficient multiple input multiple output technology is particularly required. In such a situation, an MIMO communication technology is a next-generation mobile communication technology which may be widely used in a mobile communication terminal and a relay and attracts a concern as a technology to overcome a limit of a transmission amount of another mobile communication according to a limit situation due to data communication extension, and the like.

Meanwhile, the multiple input multiple output (MIMO) technology among various transmission efficiency improvement technologies which have been researched in recent years as a method that may epochally improve a communication capacity and transmission and reception performance without additional frequency allocation or power increment has the largest attention in recent years.

FIG. 5 is a configuration diagram of a general multiple input multiple output (MIMO) communication system.

Referring to FIG. 5, when the number of transmitting antennas increases to NT and the number of receiving antennas increases to NR at the same time, since a theoretical channel transmission capacity increases in proportion to the number of antennas unlike a case using multiple antennas only in a transmitter or a receiver, a transfer rate may be improved and frequency efficiency may be epochally improved. In this case, the transfer rate depending on an increase in channel transmission capacity may theoretically increase to a value acquired by multiplying a maximum transfer rate (Ro) in the case using one antenna by a rate increase rate (Ri) given below.

$$R_i = \min(N_T, N_R) \qquad \text{[Equation 1]}$$

That is, for example, in an MIMO communication system using four transmitting antennas and four receiving antennas, a transfer rate which is four times higher than a single antenna system may be acquired.

Such an MIMO antenna technology may be divided into a spatial diversity scheme increasing transmission reliability by using symbols passing through various channel paths and a spatial multiplexing scheme improving the transfer rate by simultaneously transmitting multiple data symbols by using multiple transmitting antennas. Further, a research into a scheme that intends to appropriately acquire respective advantages by appropriately combining two schemes is also a field which has been researched in recent years.

The respective schemes will be described below in more detail.

First, the spatial diversity scheme includes a space-time block coding series and a space-time Trelis coding series scheme simultaneously using a diversity gain and a coding gain. In general, the Trelis is excellent in bit error rate enhancement performance and code generation degree of freedom, but the space-time block code is simple in operational complexity. In the case of such a spatial diversity gain, an amount corresponding to a multiple (NT×NR) of the number (NT) of transmitting antennas and the number (NR) of receiving antennas may be acquired.

Second, the spatial multiplexing technique is a method that transmits different data arrays in the respective transmitting antennas and in this case, mutual interference occurs among data simultaneously transmitted from the transmitter in the receiver. The receiver receives the data after removing the interference by using an appropriate signal processing technique. A noise removing scheme used herein includes a maximum likelihood detection (MLD) receiver, a zero-forcing (ZF) receiver, a minimum mean square error (MMSE) receiver, a diagonal-bell laboratories layered space-time (D-BLAST), a vertical-bell laboratories layered space-time), and the like and in particular, when channel information may be known in the transmitter side, a singular value decomposition (SVD) scheme, and the like may be used.

Third, a technique combining the space diversity and the spatial multiplexing may be provided. When only the spatial diversity gain is acquired, the performance enhancement gain depending on an increase in diversity degree is gradually saturated and when only the spatial multiplexing gain is acquired, the transmission reliability deteriorates in the radio channel. Schemes that acquire both two gains while solving the problem have been researched and the schemes include a space-time block code (Double-STTD), a space-time BICM (STBICM), and the like.

In order to describe a communication method in the MIMO antenna system described above by a more detailed method, when the communication method is mathematically modeled, the mathematical modeling may be shown as below.

First, it is assumed that NT transmitting antennas and NR receiving antennas are present as illustrated in FIG. 5.

First, in respect to a transmission signal, when NT transmitting antennas are provided, NT may be expressed as a vector given below because the maximum number of transmittable information is NT.

$$s[s_1, s_2, \ldots, s_{N_T}]^T \quad \text{[Equation 2]}$$

Transmission power may be different in the respective transmission information s1, s2, . . . , sNT and in this case, when the respective transmission power is P1, P2, . . . , PNT, the transmission information of which the transmission power is adjusted may be expressed as a vector given below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Further, $\hat{s}$ may be expressed as described below as a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

The information vector $\hat{s}$ of which the transmission power is adjusted is multiplied by a weight matrix W to constitute NT transmission signals x1, x2, . . . , xNT which are actually transmitted. Herein, the weight matrix serves to appropriately distribute the transmission information to the respective antennas according to a transmission channel situation, and the like. The transmission signals x1, x2, . . . , xNT may be expressed as below by using a vector x.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, wij represents a weight between the i-th transmitting antenna and j-th transmission information and W represents the weight as the matrix. The matrix W is called a weight matrix or a precoding matrix.

The transmission signal x described above may be divided into transmission signals in a case using the spatial diversity and a case using the spatial multiplexing.

In the case using the spatial multiplexing, since different signals are multiplexed and sent, all elements of an information vector s have different values, while when the spatial diversity is used, since the same signal is sent through multiple channel paths, all of the elements of the information vector s have the same value.

A method mixing the spatial multiplexing and the spatial diversity may also be considered. That is, for example, a case may also be considered in which the same signal is transmitted using the spatial diversity through three transmitting antennas and different signals are sent by spatial multiplexing through residual transmitting antennas.

Next, when NR receiving antennas are provided, received signals y1, y2, . . . , yNR of the respective antennas are expressed as a vector y as described below.

$$y = [y_1, y_2, \ldots, y_{N_R}]^T \quad \text{[Equation 6]}$$

If channels are modeled in the MIMO antenna communication system, the channels may be distinguished based on transmitting and receiving antenna indexes and a channel passing through a receiving antenna i from a transmitting antenna j will be represented as hij. Herein, it is noted that in the case of the order of the index of hij, the receiving antenna index is earlier and the transmitting antenna index is later.

The multiple channels are gathered into one to be expressed even as vector and matrix forms. An example of expression of the vector will be described below.

FIG. 6 is a diagram illustrating a channel from multiple transmitting antennas to one receiving antenna.

As illustrated in FIG. 6, a channel which reaches receiving antenna I from a total of NT transmitting antennas may be expressed as below.

$$h_i^T = [h_{i1}, h_{i2}, \ldots, h_{iN_T}] \quad \text{[Equation 7]}$$

Further, all of channels passing through NR receiving antennas from NT transmitting antennas may be shown as below through matrix expression shown in Equation given above.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

Since additive white Gaussian noise (AWGN) is added after passing through a channel matrix H given above in an actual channel, white noises n1, n2, . . . , nNR added to NR receiving antennas, respectively are expressed as below.

$$n = [n_1, n_2, \ldots, n_{N_R}]^T \quad \text{[Equation 9]}$$

Each of the transmission signal, the reception signal, the channel, and the white noise in the MIMO antenna communication system may be expressed through a relationship given below by modeling the transmission signal, the reception signal, the channel, and the white noise.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

The number of rows and columns of the channel matrix H representing the state of the channel is determined by the number of transmitting and receiving antennas. In the case of the channel matrix H, the number of rows becomes equivalent to NR which is the number of receiving antennas and the number of columns becomes equivalent to NR which is the number of transmitting antennas. That is, the channel matrix H becomes an NR×NR matrix.

In general, a rank of the matrix is defined as the minimum number among the numbers of independent rows or columns. Therefore, the rank of the matrix may not be larger than the number of rows or columns. As an equation type example, the rank (rank(H)) of the channel matrix H is limited as below.

$$\text{rank}(H) \leq \min(N_T, N_R) \quad \text{[Equation 11]}$$

Further, when the matrix is subjected to Eigen value decomposition, the rank may be defined as not 0 but the number of Eigen values among the Eigen values. By a similar method, when the rank is subjected to singular value decomposition, the rank may be defined as not 0 but the number of singular values. Accordingly, a physical meaning of the rank in the channel matrix may be the maximum number which may send different information in a given channel.

In this specification, a 'rank' for MIMO transmission represents the number of paths to independently transmit the signal at a specific time and in a specific frequency resource and 'the number of layers' represents the number of signal streams transmitted through each path. In general, since the transmitter side transmits layers of the number corresponding to the number of ranks used for transmitting the signal, the rank has the same meaning as the number layers if not particularly mentioned.

Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, a multi-carrier means an aggregation of carriers (alternatively carrier aggregation). In this case, the aggregation of carriers means both an aggregation between continuous carriers and an aggregation between non-contiguous carriers. Further, the number of component carriers aggregated between downlink and uplink may be differently set. A case where the number of downlink component carriers (hereinafter referred to as a "DL CC") and the number of uplink component carriers (hereinafter, referred to as an "UL CC") are the same is referred to as a "symmetric aggregation", and a case where the number of downlink component carriers and the number of uplink component carriers are different is referred to as an "asymmetric aggregation." The carrier aggregation may be used interchangeably with a term, such as a bandwidth aggregation or a spectrum aggregation.

A carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell or S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively a primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRCConnectionReconfiguration) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfiguration) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

FIG. 7 illustrates examples of a component carrier and carrier aggregation in the wireless communication system to which the present invention can be applied.

FIG. 7a illustrates a single carrier structure used in an LTE system. The component carrier includes the DL CC and the UL CC. One component carrier may have a frequency range of 20 MHz.

FIG. 7b illustrates a carrier aggregation structure used in the LTE system. In the case of FIG. 7b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (MN) DL CCs to the terminal. In this case, the terminal may monitor only M limited DL CCs and receive the DL signal. Further, the network gives L (LMN) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

If one or more S cells are configured in a UE, a network may activate or deactivate the configured S cell(s). A P cell is always activated. The network activates or deactivates the S cell(s) by sending an activation/deactivation MAC control element.

The activation/deactivation MAC control element has a fixed size and includes a single octet including seven C fields and one R field. The C field is configured for each S cell index "SCellIndex", and indicates the activation/deactivation state of the S cell. When the value of the C field is set to "1", it indicates that an S cell having a corresponding S cell index is activated. When the value of the C field is set to "0", it indicates that an S cell having a corresponding S cell index is deactivated.

Furthermore, the UE maintains a timer "sCellDeactivationTimer" for each configured S cell and deactivates a related S cell when the timer expires. The same initial value of the timer is applied to each instance of the timer "sCellDeactivationTimer" and set by RRC signaling. When the S cell(s) are added or after handover, initial S cell(s) are a deactivation state.

The UE performs the following operation on each of the configured S cell(s) in each TTI.

When the UE receives an activation/deactivation MAC control element that activates an S cell in a specific TTI (subframe n), the UE activates the S cell in a corresponding TTI (a subframe n+8 or thereafter) on predetermined timing and (re)starts a timer related to the corresponding S cell. What the UE activates the S cell means that the UE applies a common S cell operation, such as the transmission of a sounding reference signal (SRS), the reporting of a channel quality indicator (CQI)/precoding matrix indicator (PMI)/rank indication (RI)/precoding type indicator (PTI), the monitoring of a PDCCH and the monitoring of a PDCCH for an S cell on the S cell.

When the UE receives an activation/deactivation MAC control element that deactivates an S cell in a specific TTI (subframe n) or a timer related to a specific TTI (subframe n)-activated S cell expires, the UE deactivates the S cell in a corresponding TTI (subframe n+8 or thereafter) on predetermined timing, stops the timer of the corresponding S cell, and flushes all of HARQ buffers related to the corresponding S cell.

If a PDCCH on an activated S cell indicates an uplink grant or downlink assignment or a PDCCH on a serving cell that schedules the activated S cell indicates an uplink grant or downlink assignment for the activated S cell, the UE restarts a timer related to the corresponding S cell.

When the S cell is deactivated, the UE does not send an SRS on the S cell, does not report a CQI/PMI/RI/PTI for the S cell, does not send an UL-SCH on the S cell, and does not monitor a PDCCH on the S cell.

Random Access Procedure

A random access procedure provided by LTE/LTE-A systems is described below.

The random access procedure is used for a UE to obtain uplink synchronization with an eNB or to have uplink radio resources allocated thereto. When the UE is powered on, the UE obtains downlink synchronization with an initial cell and receives system information. The UE obtains information about a set of available random access preambles and radio resources used to send a random access preamble from the system information. The radio resources used to send the random access preamble may be specified as a combination of at least one subframe index and an index in a frequency domain. The UE sends a random access preamble randomly selected from the set of random access preambles. An eNB that has received the random access preamble sends a timing alignment (TA) value for uplink synchronization to the UE through a random access response. Accordingly, the UE obtains uplink synchronization.

The random access procedure is common to frequency division duplex (FDD) and time division duplex (TDD). The random access procedure is not related to a cell size and is also not related to the number of serving cells if a component aggregation (CA) has been configured.

First, the UE may perform the random access procedure as in the following cases.

If the UE performs initial access in the RRC idle state because it does not have RRC connection with the eNB If the UE performs an RRC connection re-establishment procedure If the UE first accesses a target cell in a handover process If the random access procedure is requested by a command from the eNB If there is data to be transmitted in downlink in an uplink non-synchronized situation during the RRC connection state If there is a data to be transmitted in uplink in an uplink non-synchronized situation or in a situation in which designated radio resources used to request radio resources have not been allocated during the RRC connection state If the positioning of the UE is performed in a situation in which timing advance is necessary during the RRC connection state If a recovery process is performed when a radio link failure or handover failure occurs In 3GPP Rel-10, a method for applying a timing advance (TA) value applicable to one specific cell (e.g., a P cell) to a plurality of cells in common in a radio access system supporting a component aggregation has been taken into consideration. A UE may aggregate a plurality of cells belonging to different frequency bands (i.e., greatly spaced apart on the frequency) or a plurality of cells having different propagation properties. Furthermore, in the case of a specific cell, in order to expand coverage or remove a coverage hole, if the UE performs communication with an eNB (i.e., a macro eNB) through one cell and performs communication with a secondary eNB (SeNB) through the other cell in a situation in which a remote radio header (RRH) (i.e., repeater), a small cell such as a femto cell or a pico cell, or the SeNB has been disposed within the cell, a plurality of cells may have different delay properties. In this case, if the UE performs uplink transmission using a method for applying one TA value to a plurality of cells in common, the synchronization of an uplink signal transmitted on the plurality of cells may be severely influenced. Accordingly, a plurality of TAs may be used in a CA situation in which a plurality of cells has been aggregated. In 3GPP Rel-11, in order to support multiple TAs, the independent allocation of the TAs may be taken into consideration for each specific cell group. This is called a TA group (TAG). The TAG may include one or more cells. The same TA may be applied to one or more cells included in a TAG in common. In order to support such multiple TAs, an MAC TA command control element includes a TAG identity (ID) of 2 bits and a TA command field of 6 bits.

A UE in which a CA has been configured performs a random access procedure if it performs the random access procedure in relation to a P cell. In the case of a TAG to which the P cell belongs (i.e., a primary TAG (pTAG)), as in a conventional technology, TA determined based on the P cell or coordinated through a random access procedure involved in the P cell may be applied to all of cell(s) within the pTAG. In contrast, in the case of a TAG including only an S cell (i.e., a secondary TAG (sTAG)), TA determined based on a specific S cell within the sTAG may be applied to all of cell(s) within the corresponding sTAG. In this case, the TA may be obtained by a random access procedure initiated by an eNB. More specifically, the S cell is configured as a random access channel (RACH) resource within the sTAG. In order to determine the TA, the eNB requests RACH access in the S cell. That is, the eNB initiates RACH transmission on S cells in response to a PDCCH order transmitted in the P cell. A response message for an S cell preamble is transmitted through a P cell using an RA-RNTI. The UE may apply TA, determined based on an S cell to which random access has been successfully completed, to all of cell(s) within a corresponding sTAG. As described above, the random access procedure may be performed even in an S cell in order to obtain the TA of an sTAG to which the S cell belongs even in the corresponding S cell.

An LTE/LTE-A system provides a contention-based random access procedure for randomly selecting, by a UE, one preamble within a specific set and using the selected preamble and a non-contention-based random access procedure for using a random access preamble allocated to only a specific UE by an eNB in a process of selecting a random access preamble (RACH preamble). In this case, the non-contention-based random access procedure may be used for only UE positioning and/or timing advance alignment for an sTAG if it is requested in the handover process or in response to a command from the eNB. After the random access procedure is completed, common uplink/downlink transmission is performed.

A relay node (RN) also supports both the contention-based random access procedure and the non-contention-based random access procedure. When a relay node performs the random access procedure, it suspends an RN subframe configuration at that point of time. That is, this means that it temporarily discards an RN subframe. Thereafter, an RN subframe configuration is restarted at a point of time at which a random access procedure is successfully completed.

FIG. 8 is a diagram for illustrating a contention-based random access procedure in a wireless communication system to which an embodiment of the present invention may be applied.

(1) First Message (Msg 1 or Message 1)

First, UE randomly selects one random access preamble (RACH preamble) from a set of random access preambles indicated by system information or a handover command, selects a physical RACH (PRACH) resource capable of sending the random access preamble, and sends the selected physical RACH (PRACH).

The random access preamble is transmitted through 6 bits in an RACH transport channel. The 6 bits include a random identity of 5 bits for identifying the UE that has performed RACH transmission and 1 bit (e.g., indicate the size of a third message Msg3) for indicating additional information.

An eNB that has received the random access preamble from the UE decodes the random access preamble and obtains an RA-RNTI. The RA-RNTI related to the PRACH in which the random access preamble has been transmitted is determined by the time-frequency resource of the random access preamble transmitted by the corresponding UE.

(2) Second Message (Msg 2 or Message 2)

The eNB sends a random access response, addressed by the RA-RNTI obtained through the preamble on the first message, to the UE. The random access response may include a random access (RA) preamble index/identifier, uplink (UL) assignment providing notification of uplink radio resources, a temporary C-RNTI, and a time alignment command (TAC). The TAC is information indicative of a time alignment command that is transmitted from the eNB to the UE in order to maintain uplink time alignment. The UE updates uplink transmission timing using the TAC. When the UE updates time synchronization, it initiates or restarts a time alignment timer. An UL grant includes uplink resource allocation used for the transmission of a scheduling message (third message) to be described later and a transmit power command (TPC). The TPC is used to determine transmission power for a scheduled PUSCH.

After the UE sends the random access preamble, it attempts to receive its own random access response within a random access response window indicated by the eNB through system information or a handover command, detects a PDCCH masked with an RA-RNTI corresponding to the PRACH, and receives a PDSCH indicated by the detected PDCCH. Information about the random access response may be transmitted in the form of a MAC packet data unit (PDU). The MAC PDU may be transferred through the PDSCH. The PDCCH may include information about the UE that needs to receive the PDSCH, information about the frequency and time of the radio resources of the PDSCH, and the transmission format of the PDSCH. As described above, once the UE successfully detects the PDCCH transmitted thereto, it may properly receive the random access response transmitted through the PDSCH based on the pieces of information of the PDCCH.

The random access response window means a maximum time interval during which the UE that has sent the preamble waits to receive the random access response message. The random access response window has a length of "ra-ResponseWindowSize" that starts from a subframe subsequent to three subframes from the last subframe in which the preamble is transmitted. That is, the UE waits to receive the random access response during a random access window secured after three subframes from a subframe in which the preamble has been transmitted. The UE may obtain the parameter value of a random access window size "ra-ResponseWindowsize" through the system information. The random access window size may be determined to be a value between 2 and 10.

When the UE successfully receives the random access response having the same random access preamble index/identifier as the random access preamble transmitted to the eNB, it suspends the monitoring of the random access response. In contrast, if the UE has not received a random access response message until the random access response window is terminated or the UE does not receive a valid random access response having the same random access preamble index as the random access preamble transmitted to the eNB, the UE considers the reception of a random access response to be a failure and then may perform preamble retransmission.

As described above, the reason why the random access preamble index is necessary for the random access response is to provide notification that an UL grant, a TC-RNTI and a TAC are valid for which UE because random access response information for one or more UEs may be included in one random access response.

(3) Third Message (Msg 3 or Message 3)

When the UE receives a valid random access response, it processes each of pieces of information included in the random access response. That is, the UE applies a TAC to each of the pieces of information and stores a TC-RNTI. Furthermore, the UE sends data, stored in the buffer of the UE, or newly generated data to the eNB using an UL grant. If the UE performs first connection, an RRC connection request generated in the RRC layer and transferred through a CCCH may be included in the third message and transmitted. In the case of an RRC connection re-establishment procedure, an RRC connection re-establishment request generated in the RRC layer and transferred through a CCCH may be included in the third message and transmitted. Furthermore, the third message may include an NAS access request message.

The third message may include the identity of the UE. In the contention-based random access procedure, the eNB is unable to determine which UE can perform the random access procedure. The reason for this is that the UE has to be identified in order to perform a collision resolution.

A method for including the identity of UE includes two methods. In the first method, if UE has already had a valid cell identity (C-RNTI) allocated in a corresponding cell prior to a random access procedure, the UE sends its own cell identity through an uplink transmission signal corresponding to an UL grant. In contrast, if a valid cell identity has not been allocated to the UE prior to a random access procedure, the UE includes its own unique identity (e.g., an S-TMSI or a random number) in an uplink transmission signal and sends the uplink transmission signal. In general, the unique identity is longer than a C-RNTI. In transmission on an UL-SCH, UE-specific scrambling is used. In this case, if a C-RNTI has not been allocated to the UE, the scrambling may not be based on the C-RNTI, and instead a TC-RNTI received in a random access response is used. If the UE has sent data corresponding to the UL grant, it initiates a timer for a collision resolution (i.e., a contention resolution timer).

(4) Fourth Message (Msg 4 or Message 4)

When the C-RNTI of the UE is received through the third message from the UE, the eNB sends a fourth message to the UE using the received C-RNTI. In contrast, when the eNB receives a unique identity (i.e., an S-TMSI or a random number) through the third message from the UE, it sends the fourth message to the UE using a TC-RNTI allocated to the corresponding UE in a random access response. In this case, the fourth message may correspond to an RRC connection setup message including a C-RNTI.

After the UE sends data including its own identity through the UL grant included in the random access response, it waits for an instruction from the eNB for a collision resolution. That is, the UE attempts to receive a PDCCH in order to receive a specific message. A method for receiving the PDCCH includes two methods. As described above, if the third message transmitted in response to the UL grant includes a C-RNTI as its own identity, the UE attempts the reception of a PDCCH using its own C-RNTI. If the identity is a unique identity (i.e., an S-TMSI or a random number), the UE attempts the reception of a PDCCH using a TC-RNTI included in the random access response. Thereafter, in the former case, if the UE has received a PDCCH through its own C-RNTI before a collision resolution timer expires, the UE determines that the random access procedure has been normally performed and terminates the random access procedure. In the latter case, if the UE has received a PDCCH through a TC-RNTI before a collision resolution timer expires, the UE checks data in which a PDSCH indicated by the PDCCH is transferred. If, as a result of the check, it is found that the unique identity of the UE has been included in the contents of the data, the UE determines that the random access procedure has been normally performed and terminates the random access procedure. The UE obtains the C-RNTI through the fourth message. Thereafter, the UE and a network send or receive a UE-dedicated message using the C-RNTI.

A method for a collision resolution in random access is described below.

The reason why a collision occurs in performing random access is that the number of random access preambles is basically limited. That is, a UE randomly selects one of common random access preambles and sends the selected random access preamble because an eNB cannot assign a random access preamble unique to a UE to all of UEs. Accordingly, two or more UEs may select the same random access preamble and send it through the same radio resources (PRACH resource), but the eNB determines the received random access preambles to be one random access preamble transmitted by one UE. For this reason, the eNB sends a random access response to the UE, and expects that the random access response will be received by one UE. As described above, however, since a collision may occur, two or more UEs receive one random access response and thus the eNB performs an operation according to the reception of each random access response for each UE. That is, there is a problem in that the two or more UEs send different data through the same radio resources using one UL grant included in the random access response. Accordingly, the transmission of the data may all fail, and the eNB may receive only the data of a specific UE depending on the location or transmission power of the UEs. In the latter case, all of the two or more UEs assume that the transmission of their data was successful, and thus the eNB has to notify UEs that have failed in the contention of information about the failure. That is, providing notification of information about the failure or success of the contention is called a collision resolution.

A collision resolution method includes two methods. One method is a method using a collision resolution timer, and the other method is a method of sending the identity of a UE that was successful in a contention to other UEs. The former method is used when a UE already has a unique C-RNTI prior to a random access process. That is, the UE that has already had the C-RNTI sends data, including its own C-RNTI, to an eNB in response to a random access response, and drives a collision resolution timer. Furthermore, when PDCCH information indicated by its own C-RNTI is received before the collision resolution timer expires, the UE determines that it was successful in the contention and normally terminates the random access. In contrast, if the UE does not receive a PDCCH indicated by its own C-RNTI before the collision resolution timer expires, the UE determines that it failed in the contention and may perform a random access process again or may notify a higher layer of the failure of the contention. In the latter method of the two contention resolution methods, that is, the method of sending the identity of a successful UE, is used if a UE does not have a unique cell identity prior to a random access process. That is, if the UE does not have its own cell identity, the UE includes an identity (or an S-TMSI or a random number) higher than the cell identity in data based on UL grant information included in a random access response, sends the data, and drives a collision resolution timer. If data including its own higher identity is transmitted through a DL-SCH before the collision resolution timer expires, the UE determines that the random access process was successful. In contrast, if data including its own higher identity is not received through a DL-SCH before the collision resolution timer expires, the UE determines that the random access process has failed.

Unlike in the contention-based random access procedure shown in FIG. 8, the operation in the non-contention-based random access procedure is terminated by only the transmission of the first message and the second message. In this case, before a UE sends a random access preamble to an eNB as the first message, the eNB allocates the random access preamble to the UE, and the UE sends the allocated random access preamble to the eNB as the first message and receives a random access response from the eNB. Accordingly, the random connection procedure is terminated.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transceiving efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system can be mainly categorized into two types. In particular, there are a reference signal for the purpose of channel information acquisition and a reference signal used for data demodulation. Since the object of the former reference signal is to enable a UE (user equipment) to acquire a channel information in DL (downlink), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like. The latter reference signal is the reference signal transmitted together when a base station transmits DL data. If a UE receives the corresponding reference signal, the UE can perform channel estimation, thereby demodulating data. And, the corresponding reference signal should be transmitted in a data transmitted region.

The DL reference signals are categorized into a common reference signal (CRS) shared by all terminals for an acquisition of information on a channel state and a measurement associated with a handover or the like and a dedicated reference signal (DRS) used for a data demodulation for a specific terminal. Information for demodulation and channel measurement may be provided by using the reference signals. That is, the DRS is used only for data demodulation only, while the CRS is used for two kinds of purposes including channel information acquisition and data demodulation.

The receiver side (that is, terminal) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as the UE-specific RS or the demodulation RS (DMRS).

FIG. 9 illustrates a reference signal pattern mapped to a downlink resource block pair in the wireless communication system to which the present invention can be applied.

Referring to FIG. 9, as a unit in which the reference signal is mapped, the downlink resource block pair may be expressed by one subframe in the timedomain×12 subcarriers in the frequency domain. That is, one resource block pair has a length of 14 OFDM symbols in the case of a normal cyclic prefix (CP) (FIG. 9a) and a length of 12 OFDM symbols in the case of an extended cyclic prefix (CP) (FIG. 9b). Resource elements (REs) represented as '0', '1', '2', and '3' in a resource block lattice mean the positions of the CRSs of antenna port indexes '0', '1', '2', and '3', respectively and resource elements represented as 'D' means the position of the DRS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (base station). The RSs are transmitted based on maximum 4 antenna ports depending on the number of transmitting antennas of a base station in the 3GPP LTE system (for example, release-8). The transmitter side has three types of antenna arrays of three single transmitting antennas, two transmitting antennas, and four transmitting antennas. For instance, in case that the number of the transmitting antennas of the base station is 2, CRSs for antenna #1 and antenna #2 are transmitted. For another instance, in case that the number of the transmitting antennas of the base station is 4, CRSs for antennas #1 to #4 are transmitted.

When the base station uses the single transmitting antenna, a reference signal for a single antenna port is arrayed.

When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

The DRS is described in more detail below. The DRS is used to demodulate data. Precoding weight used for a specific UE in MIMO antenna transmission is used without any change in order for a UE to estimate a corresponding channel in association with a transport channel transmitted in each transmission antenna when the UE receives a reference signal.

The 3GPP LTE system (e.g., Release-8) supports up to a maximum of four transmission antennas, and a DRA for rank 1 beamforming is defined. The DRS for rank 1 beamforming further indicates a reference signal an antenna port index 5.

The LTE-A system which is an evolved version of the LTE system should support maximum eight transmitting antennas for downlink transmission. Accordingly, reference signals for maximum eight transmitting antennas should also be supported. In the LTE system, since the downlink reference signals are defined for maximum four antenna ports, if the base station includes four or more downlink transmitting antennas and maximum eight downlink transmitting antennas in the LTE-A system, the reference signals for these antenna ports should be defined additionally. The reference signals for maximum eight transmitting antenna ports should be designed for two types of reference signals, i.e., the reference signal for channel measurement and the reference signal for data demodulation.

One of important considerations in designing the LTE-A system is the backward compatibility. That is, the backward compatibility means that the LTE user equipment should be operated normally even in the LTE-A system without any problem and the LTE-A system should also support such normal operation. In view of reference signal transmission, the reference signals for maximum eight transmitting antenna ports should be defined additionally in the time-frequency domain to which CRS defined in the LTE is transmitted on full band of each subframe. However, in the LTE-A system, if reference signal patterns for maximum eight transmitting antennas are added to full band per subframe in the same manner as the CRS of the existing LTE system, the RS overhead becomes too great.

Accordingly, the reference signal designed newly in the LTE-A system may be divided into two types. Examples of the two types of reference signals include a channel state information-reference signal (CSI-RS) (or may be referred to as channel state indication-RS) for channel measurement for selection of modulation and coding scheme (MCS) and a precoding matrix index (PMI), and a data demodulation-reference signal (DM-RS) for demodulation of data transmitted to eight transmitting antennas.

The CSI-RS for the channel measurement purpose is designed for channel measurement mainly unlike the existing CRS used for channel measurement, handover measurement, and data demodulation. The CSI-RS may also be used for handover measurement. Since the CSI-RS is transmitted only to obtain channel state information, it may not be transmitted per subframe unlike the CRS of the existing LTE system. Accordingly, in order to reduce overhead, the CSI-RS may intermittently be transmitted on the time axis.

The DM-RS is dedicatedly transmitted to the UE which is scheduled in the corresponding time-frequency domain for data demodulation. In other words, the DM-RS of a specific UE is only transmitted to the region where the corresponding user equipment is scheduled, i.e., the time-frequency domain that receives data.

In the LTE-A system, an eNB should transmit the CSI-RSs for all the antenna ports. Since the transmission of CSI-RSs for up to eight transmission antenna ports in every subframe leads to too much overhead, the CSI-RSs should be transmitted intermittently along the time axis, thereby reducing CSI-RS overhead. Therefore, the CSI-RSs may be transmitted periodically at every integer multiple of one subframe, or in a predetermined transmission pattern. The CSI-RS transmission period or pattern of the CSI-RSs may be configured by the eNB.

In order to measure the CSI-RSs, a UE should have knowledge of the information for each of the CSI-RS antenna ports in the cell to which the UE belong such as the transmission subframe index, the time-frequency position of the CSI-RS resource element (RE) in the transmission subframe, the CSI-RS sequence, and the like.

In the LTE-A system, an eNB should transmit each of the CSI-RSs for maximum eight antenna ports, respectively. The resources used for transmitting the CSI-RS of different antenna ports should be orthogonal. When an eNB transmits the CSI-RS for different antenna ports, by mapping the CSI-RS for each of the antenna ports to different REs, the resources may be orthogonally allocated in the FDM/TDM scheme. Otherwise, the CSI-RSs for different antenna ports may be transmitted in the CDM scheme with being mapped to the mutually orthogonal codes.

When an eNB notifies the information of the CSI-RS to the UE in its own cell, the information of the time-frequency in which the CSI-RS for each antenna port is mapped should be notified. Particularly, the information includes the subframe numbers on which the CSI-RS is transmitted, the period of the CSI-RS being transmitted, the subframe offset in which the CSI-RS is transmitted, the OFDM symbol number in which the CSI-RS RE of a specific antenna is transmitted, the frequency spacing, the offset or shift value of RE on the frequency axis.

The CSI-RS is transmitted through 1, 2, 4 or 8 antenna ports. In this case, the antenna port which is used is p=15, p=15,16, p=15, . . . , 18, or p=15, . . . , 22. The CSI-RS may be defined only for the subcarrier interval $\Delta f=15$ kHz (k',l') (herein, k' is a subcarrier index in a resource block, and l' represents an OFDM symbol index in a slot) and the condition of $n_s$ is determined according to the CSI-RS configuration shown in Table 3 or Table 4 below.

Table 3 exemplifies the mapping of (k',l') according to the CSI-RS configuration for the normal CP.

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |

TABLE 3-continued

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 4 exemplifies the mapping of (k',l') according to the CSI-RS configuration for the extended CP.

TABLE 4

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 3 and Table 4, for the CSI-RS transmission, in order to decrease the inter-cell interference (ICI) in the multi-cell environment including the heterogeneous network (HetNet) environment, different configurations of maximum 32 (in the case of normal CP) or maximum 28 (in the case of extended CP) are defined.

The CSI-RS configuration is different depending on the number of antenna ports in a cell and the CP, neighbor cells may have different configurations to the maximum. In addition, the CSI-RS configuration may be divided into the case of being applied to both the FDD frame and the TDD frame and the case of being applied to only the TDD frame.

Based on Table 3 and Table 4, (k',l') and $n_s$ are determined according to the CSI-RS configuration. By applying these values to Equation 19, the time-frequency resource that each CSI-RS antenna port uses for transmitting the CSI-RS is determined.

FIG. 10 is a diagram illustrating the CSI-RS configuration in a wireless communication system to which the present invention may be applied.

FIG. 10(a) shows twenty CSI-RS configurations that are usable in the CSI-RS transmission through one or two CSI-RS antenna ports, and FIG. 10(b) shows ten CSI-RS configurations that are usable by four CSI-RS antenna ports. FIG. 10(c) shows five CSI-RS configurations that are usable in the CSI-RS transmission through eight CSI-RS antenna ports.

As such, according to each CSI-RS configuration, the radio resource (i.e., RE pair) in which the CSI-RS is transmitted is determined.

When one or two CSI-RS antenna ports are configured for transmitting the CSI-RS for a specific cell, the CSI-RS is transmitted on the radio resource according to the configured CSI-RS configuration among twenty CSI-RS configurations shown in FIG. 10(a).

Similarly, when four CSI-RS antenna ports are configured for transmitting the CSI-RS for a specific cell, the CSI-RS is transmitted on the radio resource according to the configured CSI-RS configuration among ten CSI-RS configurations shown in FIG. 10(b). In addition, when eight CSI-RS antenna ports are configured for transmitting the CSI-RS for a specific cell, the CSI-RS is transmitted on the radio resource according to the configured CSI-RS configuration among five CSI-RS configurations shown in FIG. 10(c).

The CSI-RS for each of the antenna ports is transmitted with being CDM to the same radio resource for each of two antenna ports (i.e., {15,16}, {17,18}, {19,20}, {21,22}). As an example of antenna ports 15 and 16, although the respective CSI-RS complex symbols are the same for antenna ports 15 and 16, the CSI-RS complex symbols are mapped to the same radio resource with being multiplied by different orthogonal codes (e.g., Walsh code). To the complex symbol of the CSI-RS for antenna port 15, [1, 1] is multiplied, and [1, −1] is multiplied to the complex symbol of the CSI-RS for antenna port 16, and the complex symbols are mapped to the same radio resource. This procedure is the same for antenna ports {17,18}, {19,20} and {21,22}.

A UE may detect the CSI-RS for a specific antenna port by multiplying a code multiplied by the transmitted code. That is, in order to detect the CSI-RS for antenna port 15, the multiplied code [1 1] is multiplied, and in order to detect the CSI-RS for antenna port 16, the multiplied code [1 −1] is multiplied.

Referring to FIGS. 10(a) to (c), when a radio resource is corresponding to the same CSI-RS configuration index, the radio resource according to the CSI-RS configuration including a large number of antenna ports includes the radio resource according to the CSI-RS configuration including a small number of antenna ports. For example, in the case of CSI-RS configuration 0, the radio resource for eight antenna ports includes all of the radio resource for four antenna ports and one or two antenna ports.

A plurality of CSI-RS configurations may be used in a cell. Zero or one CSI-RS configuration may be used for the non-zero power (NZP) CSI-RS, and zero or several CSI-RS configurations may be used for the zero power CSI-RS.

A UE presumes the zero power transmission for the REs (except the case of being overlapped with the RE that presumes the NZP CSI-RS that is configured by a high layer) that corresponds to four CSI-RS column in Table 3 and Table 4 above, for every bit that is configured as '1' in the Zero Power CSI-RS (ZP-CSI-RS) which is the bitmap of 16 bits configured by a high layer. The Most Significant Bit (MSB) corresponds to the lowest CSI-RS configuration index, and the next bit in the bitmap corresponds to the next CSI-RS configuration index in order.

The CSI-RS is transmitted in the downlink slot only that satisfies the condition of $n_s$ mod 2 in Table 3 and Table 4 above and the CSI-RS subframe configuration.

In the case of frame structure type 2 (TDD), in the subframe that collides with a special subframe, SS, PBCH or SIB 1 (SystemInformationBlockType1) message transmission or the subframe that is configured to transmit a paging message, the CSI-RS is not transmitted.

In addition, the RE in which the CSI-RS for a certain antenna port that is belonged to an antenna port set S (S={15}, S={15,16}, S={17,18}, S={19,20} or S={21,22}) is transmitted is not used for transmitting the PDSCH or the CSI-RS of another antenna port.

Since the time-frequency resources used for transmitting the CSI-RS is unable to be used for transmitting data, the data throughput decreases as the CSI-RS overhead increases. Considering this, the CSI-RS is not configured to be transmitted in every subframe, but configured to be transmitted in a certain transmission period that corresponds to a plurality of subframes. In this case, the CSI-RS transmission overhead may be significantly decreased in comparison with the case that the CSI-RS is transmitted in every subframe.

The subframe period (hereinafter, referred to as 'CSI-RS transmission period'; $T_{CSI\text{-}RS}$) for transmitting the CSI-RS and the subframe offset ($\Delta_{CSI\text{-}RS}$) are represented in Table 5 below.

Table 5 exemplifies the configuration of CSI-RS subframe.

TABLE 5

| CSI-RS-SubframeConfig $I_{CSI\text{-}RS}$ | CSI-RS periodicity $T_{CSI\text{-}RS}$ (subframes) | CSI-RS subframe offset $\Delta_{CSI\text{-}RS}$ (subframes) |
|---|---|---|
| 0-4 | 5 | $I_{CSI\text{-}RS}$ |
| 5-14 | 10 | $I_{CSI\text{-}RS}$-5 |
| 15-34 | 20 | $I_{CSI\text{-}RS}$-15 |
| 35-74 | 40 | $I_{CSI\text{-}RS}$-35 |
| 75-154 | 80 | $I_{CSI\text{-}RS}$-75 |

Referring to Table 5, according to the CSI-RS subframe configuration ($I_{CSI\text{-}RS}$), the CSI-RS transmission period ($T_{CSI\text{-}RS}$) and the subframe offset ($\Delta_{CSI\text{-}RS}$) are determined.

The CSI-RS subframe configuration in Table 5 is configured as one of the 'SubframeConfig' field and the 'zeroTxPowerSubframeConfig' field in Table 2 above. The CSI-RS subframe configuration may be separately configured for the NZP CSI-RS and the ZP CSI-RS.

The subframe including the CSI-RS satisfies Equation 12 below.

$$(10n_f + \lfloor n_s/2 \rfloor - \Delta_{CSI\text{-}RS}) \bmod T_{CSI\text{-}RS} = 0 \quad \text{[Equation 12]}$$

In Equation 12, $T_{CSI\text{-}RS}$ represents the CSI-RS transmission period, $\Delta_{CSI\text{-}RS}$ represents the subframe offset value, $n_f$ represents the system frame number, and $n_s$ represents the slot number.

In the case of a UE in which transmission mode 9 is set for a serving cell, a single CSI-RS resource may be configured in the UE. In the case of a UE in which transmission mode 10 is set for a serving cell, one or more CSI-RS resources may be configured in the UE.

For each CSI-RS resource configuration, the following parameters may be set through high layer signaling.

If transmission mode 10 is set, the CSI-RS resource configuration identifier

The number of CSI-RS ports

The CSI-RS configuration (refer to Table 3 and Table 4)

The CSI-RS subframe configuration ($I_{CSI\text{-}RS}$; refer to Table 5)

If transmission mode 9 is set, the transmission power ($P_c$) for the CSI feedback If transmission mode 10 is set, the transmission power ($P_c$) for the CSI feedback with respect to each CSI process. When the CSI subframe sets $C_{CSI,0}$ and $C_{CSI,1}$ are set by a high layer for the CSI process, $P_c$ is set in each CSI subframe set of the CSI process.

The pseudo-random sequence generator parameter ($n_{ID}$)

If transmission mode 10 is set, the QCL scrambling identifier (qcl-ScramblingIdentity-r11) for assuming the Quasi Co-Located (QCL) type B UE, the CRS port count (crs-PortsCount-r11), and the high layer parameter ('qcl-CRS-Info-r11') that includes the MBSFN subframe configuration list (mbsfn-SubframeConfig-List-r11) parameter.

When the CSI feedback value obtained by a UE has the value in the range of [−8, 15] dB, $P_c$ is presumed by the ratio of the PDSCH EPRE for the CSI-RS EPRE. Herein, the PDSCH EPRE corresponds to the symbol in which the ratio of PDSCH EPRE for the CRS EPRE is $\rho_A$.

In the same subframe of a serving cell, the CSI-RS and the PMCH are not configured together.

When four CRS antenna ports are configured in frame structure type 2, the CSI-RS configuration index belonged to [20-31] set in the case of the normal CP (refer to Table 3) or [16-27] set in the case of the extended CP (refer to Table 4) is not configured to a UE.

A UE may assume that the CSI-RS antenna port of the CSI-RS resource configuration has the QCL relation with the delay spread, the Doppler spread, the Doppler shift, the average gain and the average delay.

The UE to which transmission mode 10 and QCL type B are configured may assume that the antenna ports 0 to 3 corresponding to the CSI-RS resource configuration and the antenna ports 15 to 22 corresponding to the CSI-RS resource configuration have the QCL relation with the Doppler spread and the Doppler shift.

For the UE to which transmission mode 10 is configured, one or more Channel-State Information-Interference Measurement (CSI-IM) resource configuration may be set.

The following parameters may be configured for each CSI-IM resource configuration through high layer signaling.

The ZP CSI-RS configuration (refer to Table 3 and Table 4)

The ZP CSI-RS subframe configuration ($I_{CSI-RS}$; refer to Table 5)

The CSI-IM resource configuration is the same as one of the configured

ZP CSI-RS resource configuration.

In the same subframe in a serving cell, the CSI-IM resource and the PMCH are not configured simultaneously.

For a UE in which transmission modes 1 to 9 are set, a ZP CSI-RS resource configuration may be configured in the UE for a serving cell. For a UE in which transmission mode 10 is set, one or more ZP CSI-RS resource configurations may be configured in the UE for the serving cell.

The following parameters may be configured for the ZP CSI-RS resource configuration through high layer signaling.

The ZP CSI-RS configuration list (refer to Table 3 and Table 4)

The ZP CSI-RS subframe configuration ($I_{CSI-RS}$; refer to Table 5)

In the same subframe in a serving cell, the ZP CSI-RS resource and the PMCH are not configured simultaneously.

Cell Measurement/Measurement Report

For one or several methods among the several methods (handover, random access, cell search, etc.) for guaranteeing the mobility of UE, the UE reports the result of a cell measurement to an eNB (or network).

In the 3GPP LTE/LTE-A system, the cell-specific reference signal (CRS) is transmitted through 0, 4, 7 and 11th OFDM symbols in each subframe on the time axis, and used for the cell measurement basically. That is, a UE performs the cell measurement using the CRS that is received from a serving cell and a neighbor cell, respectively.

The cell measurement is the concept that includes the Radio resource management (RRM) measurement such as the Reference signal receive power (RSRP) that measures the signal strength of the serving cell and the neighbor cell or the signal strength in comparison with total reception power, and so on, the Received signal strength indicator (RSSI), the Reference signal received quality (RSRQ), and the like and the Radio Link Monitoring (RLM) measurement that may evaluate the radio link failure by measuring the link quality from the serving cell.

The RSRP is a linear average of the power distribution of the RE in which the CRS is transmitted in a measurement frequency band. In order to determine the RSRP, CRS (R0) that corresponds to antenna port '0' may be used. In addition, in order to determine the RSRP, CRS (R1) that corresponds to antenna port '1' may be additionally used. The number of REs used in the measurement frequency band and the measurement duration by a UE in order to determine the RSRP may be determined by the UE within the limit that satisfies the corresponding measurement accuracy requirements. In addition, the power per RE may be determined by the energy received in the remaining part of the symbol except the CP.

The RSSI is obtained as the linear average of the total reception power that is detected from all sources including the serving cell and the non-serving cell of the co-channel, the interference from an adjacent channel, the thermal noise, and so on by the corresponding UE in the OFDM symbols including the RS that corresponds to antenna port '0'. When a specific subframe is indicated by high layer signaling for performing the RSRQ measurement, the RSSI is measured through all OFDM symbols in the indicated subframes.

The RSRQ is obtained by N×RSRP/RSSI. Herein, N means the number of RBs of the RSSI measurement bandwidth. In addition, the measurement of the numerator and the denominator in the above numerical expression may be obtained by the same RB set.

A BS may forward the configuration information for the measurement to a UE through high layer signaling (e.g., RRC Connection Reconfiguration message).

The RRC Connection Reconfiguration message includes a radio resource configuration dedicated ('radioResourceConfigDedicated') Information Element (IE) and the measurement configuration ('measConfig') IE.

The 'measConfig' IE specifies the measurement that should be performed by the UE, and includes the configuration information for the intra-frequency mobility, the inter-frequency mobility, the inter-RAT mobility as well as the configuration of the measurement gap.

Particularly, the 'measConfig' IE includes 'measObjectToRemoveList' that represents the list of the measurement object ('measObject') that is to be removed from the measurement and 'measObjectToAddModList' that represents the list that is going to be newly added or amended. In addition, 'MeasObjectCDMA2000', 'MeasObjctEUTRA', 'MeasObjectGERAN' and so on are included in the 'measObject' according to the communication technique.

The 'RadioResourceConfigDedicated' IE is used to setup/modify/release the Radio Bearer, to change the MAC main configuration, to change the Semi-Persistent Scheduling (SPS) configuration and to change the dedicated physical configuration.

The 'RadioResourceConfigDedicated' IE includes the 'measSubframePattern-Serv' field that indicates the time domain measurement resource restriction pattern for serving cell measurement. In addition, the 'RadioResourceConfigDedicated' IE includes 'measSubframeCellList' indicating the neighbor cell that is going to be measured by the UE and 'measSubframePattern-Neigh' indicating the time domain measurement resource restriction pattern for neighbor cell measurement.

The time domain measurement resource restriction pattern that is configured for the measuring cell (including the serving cell and the neighbor cell) may indicate at least one subframe per radio frame for performing the RSRQ measurement. The RSRQ measurement is performed only for the subframe indicated by the time domain measurement resource restriction pattern that is configured for the measuring cell.

As such, a UE (e.g., 3GPP Rel-10) should measure the RSRQ only in the duration configured by the subframe pattern ('measSubframePattern-Serv') for the serving cell measurement and the subframe pattern ('measSubframePattern-Neigh') for the neighbor cell measurement.

Although the measurement in the pattern for the RSRQ is not limited, but it is preferable to be measured only in the pattern for the accuracy requirement.

Quasi Co-Located (QCL) Between Antenna Ports

Quasi co-located and quasi co-location (QC/QCL) may be defined as follows.

If two antenna ports have a QC/QCL relation (or subjected to QC/QCL), a UE may assume that the large-scale property of a signal transferred through one antenna port may be inferred from a signal transferred through the other antenna port. In this case, the large-scale property includes one or more of delay spread, Doppler spread, a frequency shift, average received power, and reception timing.

Furthermore, the following may be defined. Assuming that two antenna ports have a QC/QCL relation (or subjected to QC/QCL), a UE may assume that the large-scale property of a channel transferred through one antenna port may be inferred from a wireless channel transferred through the other antenna port. In this case, the large-scale property includes one or more of delay spread, Doppler spread, Doppler shift, an average gain, and average delay.

That is, if two antenna ports have a QC/QCL relation (or subjected to QC/QCL), it means that the large-scale property of a wireless channel from one antenna port is the same as the large-scale property of a wireless channel from the other antenna port. Assuming that a plurality of antenna ports in which an RS is transmitted is taken into consideration, if antenna ports on which two types of different RSs are transmitted have a QCL relation, the large-scale property of a wireless channel from one antenna port may be replaced with the large-scale property of a wireless channel from the other antenna port.

In this specification, the QC/QCL-related definitions are not distinguished. That is, the QC/QCL concept may comply with one of the definitions. In a similar other form, the QC/QCL concept definition may be changed in a form in which antenna ports having an established QC/QCL assumption may be assumed to be transmitted at the same location (i.e., co-location) (e.g., a UE may assume antenna ports to be antenna ports transmitted at the same transmission point). The spirit of the present invention includes such similar modifications. In an embodiment of the present invention, the QC/QCL-related definitions are interchangeably used, for convenience of description.

In accordance with the concept of the QC/QCL, a UE may not assume the same large-scale property between wireless channels from corresponding antenna ports with respect to non-QC/QCL antenna ports. That is, in this case, a UE may perform independent processing on timing acquisition and tracking, frequency offset estimation and compensation, delay estimation, and Doppler estimation for each configured non-QC/QCL antenna port.

There are advantages in that a UE can perform the following operations between antenna ports capable of an assuming QC/QCL:

With respect to delay spread and Doppler spread, a UE may identically apply the results of a power-delay profile, delay spread and a Doppler spectrum, and Doppler spread estimation for a wireless channel from any one antenna port to a Wiener filter which is used upon channel estimation for a wireless channel from other antenna ports.

With respect to a frequency shift and received timing, a UE may perform time and frequency synchronization on any one antenna port and then apply the same synchronization to the demodulation of other antenna ports.

With respect to average received power, a UE may average reference signal received power (RSRP) measurement for two or more antenna ports.

For example, if a DMRS antenna port for downlink data channel demodulation has been subjected to QC/QCL with the CRS antenna port of a serving cell, a UE may apply the large-scale property of a wireless channel, estimated from its own CRS antenna port upon channel estimation through the corresponding DMRS antenna port, in the same manner, thereby improving reception performance of a DMRS-based downlink data channel.

The reason for this is that an estimation value regarding a large-scale property can be more stably obtained from a CRS because the CRS is a reference signal that is broadcasted with relatively high density every subframe and in a full bandwidth. In contrast, a DMRS is transmitted in a UE-specific manner with respect to a specific scheduled RB, and the precoding matrix of a precoding resource block group (PRG) unit that is used by an eNB for transmission may be changed. Thus, a valid channel received by a UE may be changed in a PRG unit. Accordingly, although a plurality of PRGs has been scheduled in the UE, performance deterioration may occur when the DMRS is used to estimate the large-scale property of a wireless channel over a wide band. Furthermore, a CSI-RS may also have a transmission cycle of several—several tens of ms, and each resource block has also low density of 1 resource element for each antenna port in average. Accordingly, the CSI-RS may experience performance deterioration if it is used to estimate the large-scale property of a wireless channel.

That is, a UE can perform the detection/reception, channel estimation, and channel state report of a downlink reference signal through a QC/QCL assumption between antenna ports.

Restricted RLM and RRM/CSI Measurement

As one of methods for interference coordination, an aggressor cell may use a silent subframe (or may be called an almost blank subframe (ABS)) in which the transmission power/activity of partial physical channels are reduced (in this case, to reduce the transmission power/activity may include an operation for configuring the transmission power/activity to zero power). A victim cell may perform time domain inter-cell interference coordination for scheduling UE by taking into consideration the silent subframe.

In this case, from a standpoint of a victim cell UE, an interference level may greatly vary depending on a subframe.

In such a situation, in order to perform a radio resource management (RRM) operation for measuring more accurate radio link monitoring (RLM) or RSRP/RSRQ in each subframe or to measure channel state information (CSI) for link adaptation, the monitoring/measurement may be restricted to sets of subframes having a uniform interference characteristic. In the 3GPP LTE system, restricted RLM and RRM/CSI measurement are defined as follows.

A UE monitors downlink link quality based on a cell-specific reference signal (CRS) in order to sense downlink link quality of a PCell. The UE estimates downlink radio link quality, and compares the estimate of a threshold $Q\_out$ with the estimate of a threshold $Q\_in$ order to monitor the downlink radio link quality of the PCell.

The threshold $Q\_out$ is defined as a level at which downlink radio link cannot be reliably received, and corresponds to a 10% block error rate (BER) of hypothetical PDCCH transmission in which a PCFICH error has been taken into consideration based on transmission parameters listed in Table 6 below.

The threshold $Q\_in$ is defined as a level at which downlink radio link quality can be more significantly reliably received compared to downlink radio link quality in the threshold $Q\_out$, and corresponds to a 2% BER of hypothetical PDCCH transmission in which a PCFICH error has been taken into consideration based on transmission parameters listed in Table 7 below.

When higher layer signaling indicates a specific subframe for restricted RLM, radio link quality is monitored.

Specific requirements are applied when a time domain measurement resource restriction pattern for performing RLM measurement is configured by a higher layer and if a time domain measurement resource restriction pattern configured for a cell to be measured indicates at least one subframe per radio frame for performing RLM measurement.

If CRS assistance information is provided, the requirements may be satisfied when the number of transmit antennas of one or more cells to which CRS assistance information has been provided is different from the number of transmit antennas of a cell in which RLM is performed.

If UE is not provided with CRS assistance information or CRS assistance data is not valid for the entire evaluation period, a time domain measurement restriction may be applied when a collision occurs between a CRS and an ABS configured within a non-multicast broadcast single frequency network (MBSFN) subframe.

Table 6 illustrates PDCCH/PCFICH transmission parameters in an out-of-sync status.

TABLE 6

| Attribute | value |
|---|---|
| DCI format | 1A |
| Number of control OFDM symbols | 2; bandwidth ≥10 MHz<br>3; 3 MHz ≤ bandwidth ≤ 10 MHz<br>4; bandwidth = 1.4 MHz |
| Aggregation level (CCE) | 4; bandwidth = 1.4 MHz<br>8; bandwidth ≥3 MHz |
| Ratio of PDCCH RE energy to average RS RE energy | 4 dB; if a single antenna port is used for CRS transmission by a PCell<br>1 dB; if two or four antenna ports are used for CRS transmission by a PCell |
| Ratio of PCFICH RE energy to average RS RE energy | 4 dB; if a single antenna port is used for CRS transmission by a PCell<br>1 dB: if two or four antenna ports are used for CRS transmission by a PCell |

Table 7 illustrates PDCCH/PCFICH transmission parameters in an in-sync status.

TABLE 7

| Attribute | Value |
|---|---|
| DCI format | 1C |
| Number of control OFDM symbols | 2; bandwidth ≥10 MHz<br>3; 3 MHz ≤ bandwidth ≤ 10 MHz<br>4; bandwidth = 1.4 MHz |
| Aggregation level (CCE) | 4 |
| Ratio of PDCCH RE energy to average RS RE energy | 0 dB; If a single antenna port is used for CRS transmission by a PCell<br>−3 dB; If two or four antenna ports are used for CRS transmission by a PCell |
| Ratio of PCFICH RE energy to average RS RE energy | 4 dB; If a single antenna port is used for CRS transmission by a PCell<br>1 dB; If two or four antenna ports are used for CRS transmission by a PCell |

Downlink radio link quality for a PCell is monitored by a UE in order to indicate the out-of-sync status/in-sync status in a higher layer.

In a non-DRX mode operation, a physical layer of a UE assesses radio link quality evaluated for a previous time interval by taking into consideration thresholds $Q\_out$ and $Q\_in$ in each radio frame.

If higher layer signaling indicates a specific subframe for restricted RLM, the measurement of radio link quality is not performed in other subframes not indicated in the higher layer signaling.

If radio link quality is poorer than the threshold $Q\_out$, the physical layer of a UE indicates the out-of-sync status for a higher layer within a radio frame whose radio link quality was measured. If the radio link quality is better than the threshold $Q\_in$, the physical layer of the UE indicates the in-sync status for the higher layer within a radio frame whose radio link quality was measured.

Massive MIMO

In a wireless communication system after LTE Release (Rel)-12, the introduction of an active antenna system (AAS) is taken into consideration.

Unlike in an existing passive antenna system in which an amplifier and an antenna in which the phase and size of a signal can be adjusted have been separated, the AAS means a system in which each antenna is configured to include an active element, such as an amplifier.

The AAS does not require a separate cable, a connector, and other hardware for connecting an amplifier and an antenna depending on use of an active antenna and thus has high efficiency in terms of energy and an operation cost. In particular, the AAS enables an advanced MIMO technology, such as the forming of an accurate beam pattern or 3-D beam pattern in which a beam direction and a beam width have been taken into consideration, because the AAS supports an electronic beam control method for each antenna.

Due to the introduction of an advanced antenna system, such as the AAS, a massive MIMO structure including a plurality of input/output antennas and a multi-dimensional antenna structure is also taken into consideration. For example, unlike in an existing straight-line antenna array, if a 2-D antenna array is formed, a 3-D beam pattern may be formed by the active antenna of the AAS. If a 3-D beam pattern is used from a viewpoint of a transmission antenna, the forming of a semi-static or dynamic beam in the vertical direction of a beam in addition to the horizontal direction can be performed. For example, an application, such as the forming of a sector in the vertical direction may be taken into consideration.

Furthermore, from a viewpoint of a reception antenna, when a reception beam is formed using a massive reception antenna, an effect of a rise of signal power according to an antenna array gain may be expected. Accordingly, in the case of uplink, an eNB may receive a signal transmitted by a UE through a plurality of antennas. In this case, there is an advantage in that the UE can configure its own transmission power very low by taking into consideration the gain of a massive reception antenna in order to reduce an interference influence.

FIG. 11 illustrates a system having a plurality of transmission/reception antennas through which an eNB or a UE is capable of three-dimensional (3-D) beamforming based on an AAS in a wireless communication system to which an embodiment of the present invention may be applied.

FIG. 11 is a diagram of the aforementioned example and illustrates a 3D MIMO system using a 2-D antenna array (i.e., a 2D-AAS).

Cell Coverage of Massive MIMO

A multiple antenna system, for example, a system having N transmission antennas may perform beamforming so that received power is increased by a maximum of N times at a specific point, assuming that total transmission power is identically transmitted compared to a single antenna system.

Even an eNB having multiple antennas, a channel that transfers a CRS, a PSS/SSS, a PBCH and broadcast information does not perform beamforming in a specific direction so that all of UEs within an eNB coverage area can receive them.

In some cases, a PDSCH, that is, a channel that transfers unicast information to a specific UE, performs beamforming according to the location of a corresponding UE and link situation in order to improve transmission efficiency. That is, the transmission data stream of the PDSCH is precoded in order to form a beam in a specific direction and transmitted through multiple antenna ports. Accordingly, for example, if transmission power of a CRS and transmission power of a PDSCH are the same, received power of a precoded PDSCH beamformed toward a corresponding UE may be increased up to a maximum of N times compared to average received power of a CRS to a specific UE.

Up to now, in the LTE Rel-11 system, an eNB having a maximum of 8 transmission antennas is taken into consideration. This means that received power of a precoded PDSCH may be eight times greater than average received power of a CRS. In the future, however, if the number of transmission antennas of an eNB is 100 or more due to the introduction of a massive MIMO system, a difference between received power of a CRS and received power of a precoded PDSCH may be 100 times or more. In conclusion, due to the introduction of the massive MIMO system, the coverage area of a CRS transmitted by a specific eNB and the coverage area of a DM-RS-based PDSCH are not identical.

In particular, such a phenomenon may be significant if a difference in the number of transmission antennas between two adjacent eNBs is great. A representative example includes an example in which a macro cell having 64 transmission antennas and a micro cell (e.g., a pico cell) having a single transmission antenna neighbor each other. A UE served in an initial deployment process of massive MIMO first expects that the number of antennas may be increased from many macro cells. Accordingly, in the case of a heterogeneous network in which a macro cell, a micro cell and a pico cell are mixed, there is a great difference in the number of transmission antennas between adjacent eNBs.

For example, in the case of a pico cell having a single transmission antenna, the coverage area of a CRS and the coverage area of a PDSCH are the same. In the case of a macro cell having 64 transmission antennas, the coverage area of a PDSCH is greater than the coverage area of a CRS. Accordingly, if initial access and handover are determined based on only RSRP or RSRQ, that is, reception quality of the CRS, at the boundary of the macro cell and a pico cell, an eNB capable of providing the best quality of the PDSCH may not be selected as a serving cell. As a simple solution for this problem, PDSCH received power of an eNB having N transmission antennas may be assumed to be N times great, but such a method is not the best solution if a case where the eNB cannot perform beamforming in all of directions as possible is taken into consideration.

RRM-RS

This specification proposes a method for sending a precoded reference signal (RS) and performing RRM measurement on the precoded RS. In this specification, a precoded RS for this purpose is hereinafter referred to as an "RRM-RS." The RRM-RS includes a plurality of antenna ports, and beamforming is differently configured for each antenna port so that a UE can measure RSRP for each transmission beam. For example, if an eNB is able to perform beamforming in M directions, an RRM-RS including M ports may be configured.

Cycling and Multiplexing of RRM-RS

An M-port RRM-RS may be subjected to CDM or classified into FDM/TDM in the same subframe and transmitted. That is, a transmission signal for each antenna port of the M-port RRM-RS may be transmitted using a different transmission RE in the same subframe. If a transmission signal for each antenna port of the M-port RRM-RS is transmitted using the same RE, orthogonal scrambling code may be used between antenna ports in order to avoid interference between the antenna ports.

In some cases, the number of antenna ports of an RRM-RS which may be transmitted in one subframe at the same time may be set as K, may be divided into (M/K) subframes, and may be then transmitted.

In this case, the configuration parameter of the RRM-RS includes a total number of antenna ports M and the number of antenna ports K transmitted in one subframe at the same time. The configuration parameter of the RRM-RS also includes an RRM-RS transmission cycle P and an offset 0. In this case, the RRM-RS transmission cycle is defined as the interval of subframes in which an RRM-RS is transmitted. For example, if P=10, O=5, M=64, and K=32, the RRM-RS is transmitted in subframes having subframe indices (SFI) of 5, 15, 25, 35, . . . . In the subframe having SFI=5, No. 31 RRM-RS is transmitted in an antenna port 0. In the subframe having SFI=15, No. 63 RRM-RS is transmitted in an antenna port 32. In the subframe having SFI=25, No. 31 RRM-RS is transmitted again in the antenna port 0.

In some cases, in a method for defining an RRM-RS transmission cycle as the interval of subframes in which the RS of the same antenna port is transmitted, dividing the antenna ports of an RRM-RS into (M/K) subframes, and sending the antenna ports, the antenna ports are divided into (M/K) contiguous subframes and transmitted. For example, if P=20, O=5, M=64, and K=32, an RRM-RS is transmitted in subframes having SFIs of 5, 6, 25, 26, 45, 46, . . . . In the subframe having SFI=5, No. 31 RRM-RS is transmitted in an antenna port 0. In the subframe having SFI=6, No. 63 RRM-RS is transmitted in the antenna port 32. In the subframe having SFI=25, No. 31 RRM-RS is transmitted again in the antenna port 0.

RSRP Measurement and Report

RSRP of an RRM-RS is measured and reported for each antenna port. A plurality of RRM-RSs may be configured in a UE.

If each RRM-RS is transmitted by each cell, the configuration of RRM-RSs transmitted by a serving cell and neighboring cells may be designed to a UE. One cell may send a plurality of RRM-RSs. When a UE reports RSRP of an RRM-RS, it also provides notification that the corresponding RSRP corresponds to RSRP measurement results of which antenna port of which RRM-RS.

In order to calculate RSRP of an RRM-RS, reception signal levels of respective antenna ports are averaged. A time window in which the average is calculated may be designed by an eNB, or RSRP may be calculated by averaging reception signal levels of the antenna ports of RRM-RSs during a predetermined time (e.g., 200 ms). Alternatively, RSRP may be calculated by filtering average received power obtained in each time window again.

A UE in which a plurality of RRM-RSs has been configured measures RSRP of each antenna port of each of the RRM-RSs. If R RRM-RSs have been configured in a UE and the number of antenna ports of an r-th RRM-RS is M_r, RSRP of the m-th antenna port of the r-th RRM-RS is defined as RSRP(r,m). The UE aligns the RSRP(r,m), selects RSRP of L antenna ports that belong to the aligned RSRP (r,m) and that are strongly received, and reports the selected RSRP.

As a slight modification method of the aforementioned method, a UE aligns RSRP(r,m), selects RSRP of antenna ports that belong to the aligned RSRP(r,m) and that are strongly received, and reports only pieces of RSRP of ports that fall within a specific difference compared to the RSRP of the selected antenna ports, that is, max(RSRP(r,m)). That is, RSRP of a maximum of L antenna ports, which has an RSRP difference greater than a specific threshold in an RSRP ratio or dB scale expression as follows, is reported.

$$RSRP(r,m) - \max(RSRP(r,m)) > \text{Threshold} \quad \text{[Equation 13]}$$

For another example, the antenna ports of a precoded CSI-RS configured in a corresponding UE and an RRM-RS transmitted by a serving cell having a similar beam direction may be designated as reference antenna ports. If the (m_0)-th antenna port of an (r_0)-th RRM-RS has been designed to a UE as a reference antenna port, the UE reports another antenna port if a difference between RSRP of another antenna port and RSRP of the reference antenna port falls within a specific difference. That is, the UE reports an antenna port if a difference between pieces of RSRP exceeds a specific threshold in an RSRP ratio or dB scale expression as follows.

$$RSRP(r,m) - RSRP(r\_0, m\_0) > \text{Threshold} \quad \text{[Equation 14]}$$

FIG. 12 illustrates RSRP for each antenna port of an RRM-RS according to an embodiment of the present invention.

FIG. 12 shows an example of RSRP of each antenna port of an RRM-RS including 32 antenna ports.

If a UE has been configured to report RSRP of an antenna port having RSRP of 5 dB or less compared to an antenna port having the greatest RSRP, the UE reports an antenna port having RSRP of more than 35 dB because an antenna port 13 has the greatest RSRP of 40 dB as in FIG. 12. That is, RSRP of antenna ports 24, 25 and 26 including the RSRP of the antenna port 13 is reported to an eNB.

Antenna Port Grouping

Beamforming may be differently configured for each antenna port. In this case, each antenna port corresponds to each beam.

Accordingly, each antenna port index (i) may be mapped to each beam index (i). If beams are indexed so that the directions of an (i)-th beam and an (i+1)-th beam are adjacent, as in the example of FIG. 12, RSRP between adjacent antenna ports has a similar characteristic. Such similarity is also generated between the (i)-th beam and an (i+c)-th beam, but is reduced as "c" increases. Whether high similarity is generated between some continuous and adjacent beams is determined by the interval of beams, the width of a beam, and the scattering degree of multi-paths.

An eNB that has received a report on RSRP measurement results based on an RRM-RS checks an approximate location of a corresponding UE and notifies the UE of a precoded CSI-RS configuration transmitted toward a corresponding point so that the U can measure a CSI-RS and feeds back CSI (e.g., an RI, a PMI and a CQI) for PDSCH scheduling. Furthermore, an eNB that has received a report on RSRP measurement results based on RRM-RSs transmitted by a plurality of cells determines that a corresponding UE will be handovered to which cell and which precoded CSI-RS will be configured in the UE in a target cell based on the RSRP measurement results. That is, RSRP measurement results based on RRM-RSs provide an eNB with important information necessary to determine that which precoded CSI-RS will be configured in a corresponding UE in the future.

If 4-port CSI-RSs are configured in a corresponding UE based on RSRP measurement results, such as that in the example of FIG. 12, so that a maximum of 4 data streams can be transmitted or the best beam switching is rapidly performed in line with a change of fading, it is expected that to generate and configure 4-port CSI-RSs having the same beam direction as RRM-RS ports 13, 24, 25 and 26 having the greatest RSRP will be optimal. However, overhead is too great if a CSI-RS is optimized, generated and transmitted for each UE. Accordingly, a method for reducing CSI-RS transmission overhead is to allow many UEs in the same environment to share a CSI-RS. In order to achieve the above object, CSI-RS antenna ports within one CSI-RS configuration may be precoded to have a characteristic of a beam transmitted in an adjacent direction. That is, if a 4-port CSI-RS1 having the same beam direction as RRM-RS ports 12, 13, 14 and 15 and a 4-port CSI-RS2 having the same beam direction as RRM-RS ports 24, 25, 26 and 27 have been previously configured by taking into consideration different served UEs, whether it is better to configure which CSI-RS in a corresponding UE may be determined based on the RSRP report of an RRM-RS.

In another embodiment of the present invention, RSRP is also measured and reported with respect to an antenna port group. In the proposed method, antenna ports are grouped, and RSRP of an antenna port group is calculated by averaging pieces of RSRP of antenna ports belonging to the corresponding antenna port group. The group may be previously determined or an eNB may provide notification of the group. Alternatively, a UE may determine a grouping method and report the determined grouping method.

As in the example of FIG. 12, RRM-RSs including 32 ports may be grouped every 4 ports. The groups may be disjointed and grouped into 8 (=32/4) groups. In this case, an (i)-th port group includes RRM-RS ports (4i), (4i+1), (4i+2), and (4i+3). RSRP of the (i)-th port group is defined as an average of pieces of RSRP of the antenna ports (4i), (4i+1), (4i+2), and (4i+3).

In yet another embodiment, overlapping between groups may be permitted, and grouping may be performed. If RRM-RSs including 32 ports are grouped every 4 ports, the RRM-RSs are grouped into 15 groups. In this case, an (i)-th port group includes RRM-RS ports (2i), (2i+1), (2i+2), and (2i+3). If the proposed method is generalized, ports are grouped every A ports and a port interval between adjacent groups is set as B, an (i)-th port group includes RRM-RS ports (B*i), (B*i+1), . . . , (B*i+A−1). An eNB may designate the setting of the parameters A and B to a UE, or a UE may select the setting of the parameters A and B by taking into consideration a channel environment and UE capability and report the selected setting.

As a modification of the proposed method, in a method for selecting an antenna port group to be reported, a UE may take into consideration capabilities which may be obtained through a corresponding antenna port group compared to RSRP. In this case, the UE calculates the capabilities by taking into consideration multi-layer data transmission from a plurality of antennas within the antenna port group.

Antenna Port Grouping Level

In the proposed method, a plurality of grouping methods having different sizes may be used. That is, a method for grouping antenna ports every A1 ports and a method for grouping antenna ports every A2 ports may be used at the same time. A method for grouping antenna ports every A_i ports is hereinafter referred to as a "grouping level i."

FIG. 13 illustrates RRM-RS antenna port grouping levels according to an embodiment of the present invention.

FIG. 13 shows an example of a grouping method performed by applying a 4-step grouping level to 16-port RRM-RSs. In the example, the grouping level 1 shows a method of grouping antenna ports every port and shows a method not performing grouping. Furthermore, antenna ports are grouped every 2 ports, 4 ports and 8 ports in the grouping levels 2, 3 and 4, respectively. In the example of FIG. 13, antenna port groups having the same level have been illustrated as being disjointed and configured.

In such a multiple grouping method, a UE reports RSRP for each grouping level. That is, a UE selects and reports an antenna group having high RSRP for each grouping level. Alternatively, a UE may compare RSRP of antenna groups having different levels and report a group level compared to the best group. In order to compare RSRP between antenna groups having different levels I, group RSRP of each level is corrected by a specific offset and compared. In the case where R RRM-RSs have been configured, if RSRP of the (g)-th antenna port group of the (l)-th grouping level of an (r)-th RRM-RS is defined as GRSRP(r,l,g), Adj_GRSRP(r,l,g) is calculated by correcting GRSRP(r,l,g) by an offset(r,l) designated for the (l)-th grouping level of the (r)-th RRM-RS by an eNB as follows and is compared with GRSRP(r,l,g).

$$\text{Adj\_GRSRP}(r,l,g) = \text{GRSRP}(r,l,g) + \text{offset}(r,l) \quad \text{[Equation 15]}$$

In addition, in order to reduce a frequent change in the best L reported in a method for reporting RSRP of the best L port groups for each grouping level or in all of grouping methods, RSRP may be corrected by adding a hysteresis parameter Hy.

$$\text{Adj\_GRSRP}(r,l,g) = \text{GRSRP}(r,l,g) + \text{offset}(r,l) \pm Hy \quad \text{[Equation 16]}$$

Here, the parameter Hy is to be added or subtracted is determined depending on whether a corresponding port group is included in the best L GRSRP in a previous report. If the corresponding port group is included in the best L GRSRP in the previous report, the parameter Hy is added to apply a bias so that high Adj_RSRP is obtained, thereby reducing a frequent change of a port group having the best L Adj_GRSRP.

In a proposed method, a reference antenna port group may be designated to a UE. An eNB may designate the antenna port groups of a precoded CSI-RS configured in a corresponding UE and an RRM-RS transmitted by a serving cell having the same beam direction as a reference antenna port group. A reference antenna port group may be designated in a UE for each grouping level. Alternatively, one reference antenna port group may be designated in a UE in all of grouping levels. If the (m_0)-th antenna port group of the (l_0)-th grouping level of an (r_0)-th RRM-RS has been designated in a UE as a reference antenna port group, the UE performs reporting if Adj_GRSRP of another antenna port group exceeds a specific threshold compared to Adj_GRSRP of the reference antenna port group. That is, the UE performs reporting when a difference between pieces of RSRP exceeds a specific threshold in an Adj_GRSRP ratio or dB scale expression as follows.

$$\text{Adj\_GRSRP}(r,l,g) - \text{Adj\_GRSRP}(r\_0,l\_0,m\_0) > \text{Threshold} \quad \text{[Equation 17]}$$

Alternatively, as a modification of the proposed method, a UE specifies reference RSRP through a current CSI-RS, compares RRM-RS-based RSRP results with CSI-RS-based RSRP, and selects and reports the resulting RSRP.

RRM-RS for 3-Dimension (3-D)

The aforementioned method proposed according to an embodiment of the present invention may be modified and applied if the directivity of a beam is expanded from a 2-D space to a 3-D space. The directivity of a beam on the 3-D space is controlled by the two angles of a top/bottom angle (or vertical angle) and a left/right angle (or horizontal angle). Accordingly, in order to check whether an adjacent beam is present, it is efficient to index beams using two indices, that is, a horizontal index and a vertical index. According to the characteristics of the present invention, in order for a beam index and an RRM-RS port index to have a one-to-one correspondence relation, an RRM-RS port may be indexed with a horizontal index and a vertical index.

In the case of a 3D MIMO system having M_v beams in the vertical direction and M_h beams in the horizontal direction, a total of (M_v×M_h) beams are possible. In an embodiment of the present invention, an (M_v×M_h)-port RRM-RS is configured and a horizontal index j_h (j_h= 0, . . . , M_h−1) and a vertical index j_v(j_v=0, . . . , M_v−1) are assigned to each antenna port. One-dimension index i (i=0, . . . , M_v×M_h−1) and 2-D indices j_h and j_v are assigned to each antenna port by taking into consideration the resource mapping of the (M_v×M_h)-port RRM-RS. There is a relation "(i)=f(j_h, j_v)."

FIG. 14 is a diagram illustrating antenna ports and antenna port groups of RRM-RSs arrayed in 2-D indices according to an embodiment of the present invention.

Referring to FIG. 14, each of antenna ports is indexed with (j_h, j_v). If antenna ports are grouped every A_h×A_v ports by applying the method proposed by an embodiment of the present invention and a port interval between adjacent groups is set as B_h and B_v, an (i_h, i_v)-th port group includes RRM-RS ports (B_h×i_h+j_h, B_v×i_v+j_v), (j_h=0, . . . , A_h−1), (j_v=0, . . . , A_v−1). An eNB may designate the setting of the parameters A_h, A_v and B_h, B_v for a UE, or a UE may select the setting of the parameters by taking into consideration a channel environment and UE capability and report the selected setting.

Difference Between RRM-RS and CSI-RS

In the existing LTE/LTE-A system, a CSI-RS is transmitted for the purpose of a CSI report. A UE reports a RI, a PMI and/or CQI as CSI. In some cases, the RRM-RS proposed by the present invention is used to measure RSRP for each antenna port. It may be better to use resources in which an existing CSI-RS can be configured rather than newly defining resources in which the RRM-RS is transmitted. The reason for this is that transmission efficiency of legacy UEs is not deteriorated. If the RRM-RS is transmitted in a new resource, the legacy UEs do not recognize the RRM-RS. As a result, transmission efficiency is deteriorated in a subframe in which the RRM-RS is transmitted or the RRM-RS is not scheduled. Accordingly, in a method for sending the RRM-RS using resources in which the existing CSI-RS can be configured, a CSI-RS including a corresponding resource is configured in a legacy UE and the legacy UE may be notified that data is not mapped to the corresponding resource.

Data is not mapped to a plurality of CSI-RSs configured in a UE for a CSI report. That is, a PDSCH is mapped to the plurality of CSI-RSs other than an RE to which the CSI-RS is mapped. In the proposed method according to an embodiment of the present invention, as in the CSI-RS, a PDSCH may be mapped to the RRM-RS other than an RE to which the RRM-RS is mapped. In a modified method, however, a PDSCH may be mapped to the RRM-RS regardless of the RRM-RS. In this case, a UE needs to be able to receive the RRM-RS and the PDSCH in the same RE at the same time. Alternatively, in order to guarantee the safe reception of the RRM-RS, an eNB may configure a corresponding resource as a ZP-CSI-RS so that a PDSCH is not mapped to the RRM-RS.

QCL Configuration of RRM-RS

If each cell sends an RRM-RS, the configuration of the RRM-RSs transmitted by a serving cell and neighboring cells may be designated to a UE. The UE measures a gain according to the beamforming of the serving cell and a gain according to the beamforming of the neighboring cells, and reports the measured gains to a network so that the gains are used as a criterion for determining handover. The RRM-RS may be insufficient for the tracking purpose of a signal because it has very low transmission density. Accordingly, tracking results are used to track a signal reliably received with high density, representatively, a CRS and to detect an RRM-RS. That is, the tracking results of the CRS of a serving cell are not suitable for being used for an RRM-RS transmitted by a neighboring cell due to an error in the oscillator which generates the carrier frequency of the serving cell and the neighboring cell. Accordingly, notification is provided of a quasi co-located (QCL) CRS (or another specific CS, such as a CSI-RS) that will be used to detect an RRM-RS for each RRM-RS. A UE uses the large-scale property properties of a channel, estimated from a QCL CRS (or another specific CS, such as a CSI-RS), to detect an RRM-RS. In this case, the large-scale properties of the channel may include one or more of delay spread, Doppler spread, a Doppler shift, an average gain, and average delay.

Extension to RSRQ

The proposed methods according to the embodiments of the present invention may be extended and applied to a method for measuring RSRQ for each antenna port of an RRM-RS. RSRQ is defined as a ratio of RSRP and an RSSI. Accordingly, the measurement of RSSI is added. The measurement resource of the RSSI may be identically configured in all of RRM-RSs having the same carrier frequency, that is, all of RRM-RSs configured in the same component carrier. In this case, the results of a comparison between the ports of RRM-RSs within the same component carrier are the same although RSRP or RSRQ is used. However, a comparison between the ports of RRM-RSs within heterogeneous same component carriers is different depending on whether RSRP or RSRQ is used. Accordingly, an eNB designates whether RSRP or RSRQ will be used in a UE when the UE performs an RRM report based on an RRM-RS.

In some cases, each RSSI measurement resource may be separately configured in an RRM-RS. In this case, a comparison between the ports of RRM-RSs is different even within the same component carrier depending on whether RSRP or RSRQ will be used. Accordingly, an eNB designates whether RSRP or RSRQ will be used in a UE when the UE performs an RRM report based on an RRM-RS.

Association Between RRM-RS RSRP and CRS RSRP

RSRP based on an RRM-RS according to an embodiment of the present invention has an object of incorporating the beamforming gain of an eNB having multiple antennas into the selection of a serving cell. Although a specific neighboring cell has been determined to have the best beamforming based on the RSRP of an RRM-RS, if channels broadcasted by a corresponding cell, that is, a channel in which CRS-based demodulation is performed, is not stably received, the handover of a UE to the corresponding neighboring cell cannot be performed. Accordingly, a report regarding whether both an RRM-RM and a CRS transmitted by a specific eNB have better quality needs to be received from a UE, and a handover determination and beam election need to be performed based on the report. To this end, the UE reports RSRP of the j-th antenna port or port group of an i-th RRM-RS configured in the UE and also reports RSRP of a CRS connected to the i-th RRM-RS. In this case, the CRS connected to the RRM-RS may be a CRS QCL-subjected to the RRM-RS.

Hereinafter, a CSI measurement and reporting operation method for reducing latency will be described.

A method described below may be extended and applied to systems including 3D-MIMO, massive MIMO, and the like and an amorphous cell environment, and the like.

First, the 3D-MIMO system will be described in brief.

The 3D-MIMO system is one of an optimal transmission scheme suitable for the single-cell 2D-adapative antenna system (AAS) base station illustrated above in FIG. 11 based on LTE standard (Rel-12) and the following operation may be considered.

As illustrated in FIG. 11, when the 3D-MIMO system is described with an example of configuring CSI-RS ports from an 8-by-8 (8×8) antenna array, one precoded CSI-RS port to which 'UE-dedicated beam coefficients' optimized for a specific target UE is applied is configured with respect to each of 8 antennas vertically to configure/transmit a total of 8-port (vertically precoded) CSI-RS horizontally.

Therefore, the UE may perform CSI feedback for 8 ports in the related art.

Consequently, the base station transmits CSI-RS 8 ports to which a vertical beam gain optimized for individual UEs (alternatively, specific UE group) is already applied (precoded) to the UE.

Therefore, since the UE measures the CSI-RS that undergoes the radio channel, even though the UE performs the same feedback scheme using a conventional horizontal codebook, the UE may already obtain a vertical beam gain effect of the radio channel through the CSI measurement and reporting operation for the vertically precoded CSI-RS.

In this case, a method for determining vertical beams optimized for individual UEs includes (1) a method using an RRM report result by a (vertically precoded) small-cell discovery RS (DRS), (2) a method in which the base station receives the sounding RS (SRS) of the UE in an optimal reception beam direction and converts the corresponding reception beam direction into a DL optimal beam direction by channel reciprocity and applies the DL optimal beam direction, and the like.

When the base station determines that the UE-dedicated best V-beam direction is changed due to the mobility of the UE, the base station reconfigures all RRC configurations related with the CSI-RS and an associated CSI process by the convention operation.

When an RRC reconfiguration process needs to be performed as such, RRC-level latency (e.g., by the unit of several tens to several hundreds of ms) inevitably occurs.

That is, in terms of the network, a target V-beam direction is divided into, for example, four in advance and a separate 8-port CSI-RS having precoding in each V-direction is transmitted at the corresponding separate transmission resource location.

Further, since teach UE needs CSI measurement and reporting for one specific CSI-RS configuration among 8 port CSI-RSs, each UE cannot but perform an RRC reconfiguration procedure with the network by a CSI-RS configuration to be changed when the target V-direction is changed.

2D Planar Antenna Array Model

FIG. 15 is a diagram illustrating one example of a polarization based 2D plane antenna array model.

That is, FIG. 15 illustrates one example of a 2D active antenna system (AAS) having cross polarization.

Referring to FIG. 15, the 2D planar antenna array model may be represented as (M, N, P).

Herein, M represents the number of antenna elements having the same polarization in each column, N represents the number of horizontal columns, and P represents the number of dimensions of the polarization.

In FIG. 15, in the case of cross-polarization, P=2.

FIG. 16 is a diagram illustrating one example of a transceiver units (TXRUs) model.

A TXRU model configuration corresponding to the antenna array model configuration (M, N, P) of FIG. 15 may be represented as (MTXRU, N, P).

In this case, the MTXRU means the number of TXRUs which exist in the same 2D column and the same polarization and MTXRU<=M is continuously satisfied.

Further, a TXRU virtualization model is defined by a relationship of the signal of the TXRU and the signals of the antenna elements.

Herein, q represents transmission signal vectors of M antenna elements having the same polarization in the same column, w and W represent a wideband TXRU virtualization weight vector and a matrix, and x represents signal vectors of MTXRU TXRUs.

In detail, FIG. 16a illustrates a TXRU virtualization model option-1 (sub-array partition model) and FIG. 16b illustrates a TXRU virtualization model option-2 (full connection model).

That is, the TXRU virtualization model is divided into the sub-array model, the full-connection model, and the like as illustrated in FIGS. 16a and 16b according to a correlation between the antenna elements and the TXRU.

Further, mapping of the CSI-RS ports and the TXRUs may be 1-to-1 or 1-to-many.

Hereinafter, a new transmission mode (TM) and a new DCI format for supporting Enhanced Beamforming (EBF)/Full Dimension (FD)-MIMO will be described, which is proposed in the present disclosure.

Each transmission mode (TM) supports two DCI formats.

The two DCI formats are DCI format 1A which is commonly supported by all TMs and DCI format (DCI format 2D) dependent upon TM (TM 10).

Until now, a new TM has been introduced when the corresponding DCI format is required to be evolved.

For example, TM 10 was newly defined together with DCI format 2D that has a new PQI field.

(Proposal 1): A new TM for EBF/FD-MIMO is supported only in the case that it is required for the enhancements of the existing DCI formats.

As described above, it is natural to discuss a new TM when the most important enhancement characteristics of the current specification are well identified in RAN1.

In the MIMO Work Item (WI) of Rel-12, for example, the important enhancement characteristics such as new 4-Tx codebook and PUSCH mode 3-2 do not require any modification in a DL grant but influences on the CSI reporting aspect only.

Accordingly, a new TM is not required to be defined and the enhancement characteristics was able to be triggered by an RRC signaling, and it is agreed that it may be applied to a plurality of existing TMs (TM8, TM9 and TM10).

In an initial stage of EBF/FD-MIMO WI, it is unclear the modification in a DL grant caused by an important topic in the corresponding WI.

The important work scopes that includes the scheme based on non-precoded and beamformed CSI-RS are seemed to influence on the part associated with CSI reporting only as well as to support an appropriate signaling in the specification, similar to Rel-12 MIMO WI.

Accordingly, the discussion on the new TM itself is seemed to be premature in the initial state of the WI, and preferred to be dealt after the important enhancement characteristics are commonly understood and matured to an extent to be included in the specification.

Next, in relation to the beamformed CSI-RS enhancements proposed in the present disclosure, a method for allocating beamformed CSI-RS resource(s) will be described.

(Approach 1): UE-Specific Beamforming in a Configured CSI-RS Resource

In the case of approach 1, a serving eNB may dynamically change a beamforming weight applied in NZP CSI-RS set to a UE.

When a beamforming change occurs, in order for a UE to reset a starting time of CSI measurement window, the UE may receive the corresponding indication explicitly or implicitly from the eNB.

Alternatively, a UE is configured to limit its own NZP CSI-RS measurement window (e.g., up to 1 subframe).

In addition, an interference measurement window may be used for a CSI-IM measurement.

Any one or both of measurement resource limited CSI-IM and CSI-RS may be applied in a frequency domain.

(Approach 2): CSI-RS Resource Modification for a Channel Measurement

In the case of approach 2, a UE includes M (>1) NZP CSI-RS resources.

From M CSI-RS resources, an eNB selects N (>=1) resource(s) for a single CSI process, and signals the selected resource to a UE.

Alternatively, a UE reports N CSI-RS resources selected from M CSI-RS resources that are set to an eNB or a network.

(Approach 3): Aperiodic Beamformed CSI-RS

In the case of approach 3, a UE a CSI process is set to a UE such that actual NZP CSI-RS transmission and CSI-IM measurement situations are controlled by an eNB and signaled to the UE.

Here, the CSI-RS measurement window may be configured by a higher layer signaling.

Hereinafter, each of approaches 1 to 3 is described in more detail.

(Approach 1): Dedicated CSI-RS Resource for Each UE

Approach 1 considers UE-dedicated beamformed CSI-RS resource allocation for each UE in a specific cell.

Particularly, in the case that a UE is switched from an RRC idle state to an RRC-connected state (or shifted in state), the UE is measured by other UEs always and configures a new dedicated CSI-RS resource.

Therefore, a disadvantage of approach 1 is that overhead of CSI-RS is also linearly increased as the number of UEs operated in a specific cell is increased.

Meanwhile, an advantage of approach 1 is that a serving eNB may dynamically modify the beamforming weights applied on a dedicated CSI-RS resource set to a UE.

Accordingly, the beamforming weights may be determined by an eNB with unlimited beamforming resolution and unit as long as the eNB is able to acquire the corresponding channel information used for determining the corresponding weights properly.

FIG. 17 is a diagram illustrating an example of an operation based on approach 1 proposed in the present disclosure.

That is, FIG. 17 shows an example of a method for allocating a dedicated CSI-RS resource for each UE.

Referring to FIG. 17, there are already two UEs (UE 1 and UE 2) in an RRC-connected mode, and each of the UEs are set to dedicated CSI-RS resources 1 and 2, respectively.

UE 3 is shifted from an RRC-idle state to an RRC-connected state, and consequently, UE 3 is currently set to a new CSI-RS resource which is not overlapped with any CSI-RS resources that are set in a cell.

A serving eNB may diversify the beamforming weights applied to each CSI-RS resource channel-adaptively as the corresponding UE moves in different direction.

When a modification of beamforming occurs, in order for a UE to reset a starting time of a CSI measurement window, the UE may receive an indication explicitly or implicitly from the eNB.

This is because the modification of the beamforming weights influences on a CSI calculation on a beamformed CSI-RS resource dependent upon an implementation-specific measurement window which is used by the UE.

Therefore, the UE is required to know whether the beam direction applied to set or reset a CSI measurement window properly is modified in order to obtain CSI.

Generally, it seems that approach 1 is beneficial when the number of UEs operates in a cell is very small. The reason is because the required number of UE-dedicated CSI-RS resources with respect to approach 1 is directly related to the number of operating UEs.

Otherwise, the corresponding method may be useful in the case that a network is targeted to obtain a gain from, so-called, UE-centric operation.

Here, the UE-centric operation may mean the operation with a UE-dedicated beamformed CSI-RS resource set to each UE purely.

Additionally, as shown in FIG. 17, in the case that new UE 3 is shifted (or moved) to an RRC-connected state set to new dedicated CSI-RS resource 3, the new CSI-RS resource is required to be a ratio which is matched by other UEs existed in a cell.

(Observation 1): Approach 1 is beneficial when the number of UEs operates in a cell is very small, and the reason is because the required number of UE-dedicated CSI-RS resources with respect to approach 1 is directly related to the number of operating UEs.

(Proposal 1): It is required that an explicit beam modification indication is supported for approach 1 in order for a UE to reset a starting time of a CSI measurement window.

(Approach 2): Select Among a Plurality of Configured CSI-RS Resources

In (Approach 2), a UE is set to M (>1) NZP CSI-RS resources and different beamforming weights are applied to each of the NZP CSI-RS resources.

(Approach 2-1): From M resources, an eNB selects N (>=1) CSI-RS resource(s) for the CSI process, and signals the selected resources to a UE.

As such, an indication of the eNB is signaled in the form of L1 or L2 in order to avoid RRC reconfiguration for the CSI-RS resource.

That is, it may be defined that the RRC reconfiguration occurs only when M candidate resources are required to be modified.

The indication of the eNB occurs with relatively long period.

The eNB may perform a down selection based on the hybrid scheme in which CSI-RSRP report of a UE, a channel reciprocity state or low duty cycle non-precoded CSI-RS is used among N resources.

(Approach 2-2): From M CSI-RS resources, a UE reports index(s) of N selected CSI-RS resources.

For example, such an indication of a UE may be performed together in the corresponding reporting by a resource index feedback or a selection codebook.

In the same way, the RRC reconfiguration may occurs only when M candidate resources are required to be modified.

FIG. 18 illustrates an example of operations based on approach 2 proposed in the present disclosure.

That is, FIG. 18 shows an example of a method for selecting a specific beamformed CSI-RS resource among a plurality of configured CSI-RS resources.

Referring to FIG. 18, it is shown that four (M=4) candidate CSI-RS resources are set to a plurality of UEs in a cell, and one (N=1) selected beamformed CSI-RS resource is actually used for a CSI derivation in the CSI process.

Generally, a cell may pre-configure a plurality of candidate beamformed CSI-RS resources (e.g., M=2, 4 or 8). This is because many UEs that prefer different vertical beams may be existed in cell coverage.

In this case, a UE may be instructed to measure N=1 CSI-RS resource from total M candidate beamformed CSI-RS resources.

When it is discovered that N preferred CSI-RS resources from M candidate beamformed resources is modified based on the CSI-RSRP report of a UE, like approach 2-1, it is required to be able to notify a valid CSI-RS resource modification for the CSI measurement in the CSI process to the UE.

Proposal 2: With respect to approach 2, it is required that notification of N valid CSI-RS resource is supported for the CSI measurement from M CSI-RS resources that are pre-configured to a UE.

(Approach 3): Aperiodic Beamformed CSI-RS Transmission

Another approach for supporting a channel measurement for FD-MIMO is in relation to aperiodic CSI-RS transmission.

Currently, on the contrary to the periodic NZP CSI-RS transmission, (Approach 3) is in relation to NZP CSI-RS transmission, not in relation to periodic basis.

The aperiodic CSI-RS may be transmitted only when it is required, and consequently, it may decrease CSI-RS overhead.

A specific indication may be existed in the CSI process configuration regarded as a dedicated candidate resource pool in which the associated NZP (Non Zero Power) CSI-RS resource in the CSI process is used only for aperiodic CSI-RS transmission.

In the preconfigured resource pool, an actual aperiodic CSI-RS transmission may be generated or not in all candidate transmission situations.

Such a resource pool may be shared among a plurality of UEs in a cell.

With respect to the actual identification of the aperiodic CSI-RS transmission situation by a UE, the aperiodic CSI request in the DCI in relation to the UE may be implicitly indicated so as to be measured by the UE before the reference resource associated with a recent candidate instance or a triggered aperiodic CSI request.

Proposal 3: In the DCI associated with UL, the aperiodic CSI request is used for an implicit indication in order for the UE to identify an actual aperiodic beamformed CSI-RS transmission situation.

FIG. 19 is a diagram illustrating an example of approach 3 proposed in the present disclosure.

Particularly, FIG. 19 is a diagram illustrating an example of aperiodic CSI-RS transmission.

As shown in FIG. 3, a network may configure a beamformed CSI-RS configuration (e.g., 5 ms periodicity) with a plurality of virtualization matrixes (e.g., Bi for i=1, 2, . . . , K).

For example, in subframe #4 1910 of the second radio frame in FIG. 3, a network may trigger such that a UE performs aperiodic CSI reporting, and the UE measures aperiodic CSI-RS (applied as beamforming matrix B1 by an eNB implementation) transmitted in the corresponding subframe.

In the case that the UE is triggered to report a plurality of aperiodic CSI feedbacks in a plurality of subframes, each of the subframes are associated with different virtualization matrix Bi in the corresponding CSI-RS, and in addition, the eNB may determine a proper beam direction for the UE based on the reported CSI feedbacks.

Such an aperiodic CSI-RS transmission that has a single CSI-RS configuration enables a network to process a traffic load adaptively together with dynamic modification of the virtualization matrixes.

Alternatively, the resources for the aperiodic CSI-RSs may be pooled with different channel or signal like a PDSCH.

In the case that candidate aperiodic CSI-RS resource pool is set to a PDSCH region, and in the case that the aperiodic CSI-RS is not actually transmitted in a specific instances, the corresponding candidate aperiodic CSI-RS resource pool may be reused for a PDSCH transmission.

As described above, an indicator is required to be signaled in the corresponding UE in order to notify whether the aperiodic CSI-RS may be transmitted in the corresponding resource.

When there is no indication of actual aperiodic CSI-RS transmission, in order to reuse the unused CSI-RSs for PDSCH REs, a dynamic ZP-CSI-RS configuration should be given by a proper PDSCH rate matching. Therefore, it is required to define a new DCI format that has a new TM supporting EBF/FD-MIMO.

Proposal 4: Dynamic Zero Power (ZP) CSI-RS indication is required to be supported by schemes based on beamformed CSI-RS in order to obtain important performance gain by saving CSI-RS overhead.

Evaluation Result and Comparison

Referring to Table 8 and Table 9 below, the comparison result of the approaches (approach 1 to approach 3) described above is described.

An antenna configuration of (4, 2, 2, 16) and four candidate vertical beam directions in the cell-specific aspect are considered, and vertical rank is limited to 1 for all cases.

For each of the cases of Approaches 1, 2 and 3, the NZP CSI-RS overhead for each site including 3 sectors is calculated as below.

A multiplication of the number of four horizontal antenna ports based on an assumed antenna configuration and the number of beamformed CSI-RS resources dependent upon each approach which is actually transmitted.

Table 8 summarizes the number of REs for NZP for each site and ZP CSI-RSs as well as the result average CSI-RS overhead (in REs/RB/unit of subframe) used in the simulation for each approach, and intra-site 3 cell reuse factor for NZP and ZP CSI-RS allocation is assumed.

And it is assumed that the CSI-RS transmission period is 5 ms.

In Table 8, X is the number of operating UEs in each site for approach 1, and X UE-dedicated CSI-RS resources are required.

For approach 2, regardless of the number of operating UEs, four beamformed CSI-RS resource overheads that are fixed in cell-specific manner are applied.

In Table 8, Y represents the number of disjoint vertical beam required for aperiodic beamformed CSI-RS transmission which is distinguished for approach 3, and Y is smaller or equals to the number of operating UEs that a part of the operating UEs are dependent upon whether to measure the same aperiodic beamformed CSI-RS through CSI-RS resource pooling.

More particularly, depending on whether the preferred vertical beam directions of the operating UEs are overlapped, Y is counted for all simulation environments like the number of preferred vertical beams that are not overlapped among the operating UEs.

In summary, the CSI-RS overhead is fixed for approach 2, and variable for approach 1 and 3.

Table 8 represents a CSI-RS overhead assumption for simulation.

TABLE 8

| | Approach 1 | Approach 2 | Approach 3 |
|---|---|---|---|
| # of REs for NZP and ZP CSI-RSs | 4 · X | 4 · 4 · 3 | 4 · Y |
| average CSI-RS overhead (REs/RB/subframe) | 0.8 · X | 9.6 | 0.8 · Y |

In Table 9, the evaluation result represents the comparison result among approaches 1, 2 and 3.

In approach 3, the simulation is performed with different numbers of candidate vertical beams, and the numbers are 4 and 8, respectively.

Table 9 represents Non-fell buffer simulation result for approaches 1, 2 and 3 in 3D-UMi scenario.

TABLE 9

|  | Mean UE Throughput (bps/Hz) | Mean UE Throughput Gain | 5% UE Throughput (bps/Hz) | 5% UE Throughput Gain | 50% UE Throughput (bps/Hz) | Resource Utilization | FTP load, λ (UEs/s/sector) |
|---|---|---|---|---|---|---|---|
| Approach 1 | 3.917 | — | 1.312 | — | 4.082 | 0.16 | 1.5 |
| Approach 2-1 | 3.510 | −10.4% | 1.130 | −13.8% | 3.571 | 0.18 | |
| Approach 2-2 | 3.560 | −9.1% | 1.146 | −12.6% | 3.636 | 0.18 | |
| Approach 3 with 4 vertical beams | 3.898 | −0.5% | 1.290 | −1.6% | 4.040 | 0.16 | |
| Approach 3 with 8 vertical beams | 3.938 | 0.5% | 1.303 | −0.6% | 4.082 | 0.16 | |
| Approach 1 | 2.750 | — | 0.567 | — | 2.312 | 0.39 | 2.5 |
| Approach 2-1 | 2.338 | −15.0% | 0.412 | −27.3% | 1.869 | 0.46 | |
| Approach 2-2 | 2.397 | −12.8% | 0.454 | −20.0% | 1.951 | 0.44 | |
| Approach 3 with 4 vertical beams | 2.702 | −1.7% | 0.544 | −4.2% | 2.273 | 0.40 | |
| Approach 3 with 8 vertical beams | 2.788 | 1.4% | 0.599 | 5.5% | 2.367 | 0.39 | |
| Approach 1 | 1.709 | — | 0.150 | — | 1.124 | 0.71 | 3.5 |
| Approach 2-1 | 1.519 | −11.2% | 0.126 | −16.5% | 0.926 | 0.76 | |
| Approach 2-2 | 1.564 | −8.5% | 0.137 | −8.8% | 0.978 | 0.74 | |
| Approach 3 with 4 vertical beams | 1.762 | 3.1% | 0.172 | 14.0% | 1.170 | 0.71 | |
| Approach 3 with 8 vertical beams | 1.834 | 7.3% | 0.184 | 22.2% | 1.266 | 0.69 | |

As represented in Table 9, approach 2-1 shows the lowest performance owing to the fixed CSI-RS overhead in the simulation (as summarized in Table 8), and as a result, as a reference, the throughput gain is shown for the other approaches in comparison with the performance of approach 2-1.

For further research, it is expected that the performance of approach 2-1 is more improved in the case that the dynamic ZP CSI-RS indication for reusing unused CSI-RS resources is supported by saving CSI-RS overhead.

It is shown that the performance of approach 2-2 is more slightly improved than the performance of approach 2-1 owing to the dynamic selection of a UE for N CSI-RS resources from M candidate CSI-RS resources.

However, in the case that the dynamic ZP CSI-RS is applied, approach 2-2 is unable to obtain a gain from the dynamic CSI-RS indication. This is because it is required that a UE selects N CSI-RS resources dynamically so as to be required to measure all of M candidate CSI-RS resources always.

Approaches 1 and 3 show significantly improved performance in comparison with approaches 2-1 and 2-2. It is represented that the CSI-RS overhead controlled by an aperiodic CSI-RS transmission is significantly beneficial in EBF/FD-MIMO, consequently.

With respect to approach 1, as described above, in the case that new UEs are attached to a site, a latency issue of an RRC reconfiguration of the ZP CSI-RS configuration is not considered in a simulation. However, in the case of considering a latency issue, the result of performance may become more degraded.

Approach 3 shows more improved performance than approach 1 as RU increases.

In the aperiodic beamformed CSI-RS transmission situations, vertical beams preferred by a UE are grouped and the aperiodic CSI-RS resource is allocated according to the grouped vertical beams.

Accordingly, in comparison with approach 1, the resource for the CSI-RS transmission with respect to approach 3 is less used, and consequently, approach 1 shows improved performance on the whole.

Such tendency becomes more important when the number of operating UEs increases. Accordingly, the highest performance gain is shown in, particularly, approach 3 for high RU case.

Approach 3 in which 8 vertical beams are included shows better performance than approach 3 in which 4 vertical beams are included. This is because of the gain from granularity of increased vertical beam, mainly.

Table 10 represents parameters and assumptions used in the simulation.

TABLE 10

| | |
|---|---|
| Scenarios | 3D-UMi with ISD = 200 m in 2 GHz |
| BS antenna configurations | Antenna elements config: 4 × 2 × 2 (+/−45), 0.5λ horizontal/0.8 λ vertical antenna spacing |
| MS antenna configurations | 2 Rx X-pol (0/+90) |
| System bandwidth | 10 MHz (50 RBs) |
| UE attachment | Based on RSRP (formula) from CRS port 0 |
| Duplex | FDD |
| Network synchronization | Synchronized |

TABLE 10-continued

| | |
|---|---|
| UE distribution | Follows TR36.873 |
| UE speed | 3 km/h |
| Polarized antenna modeling | Model-2 from TR36.873 |
| UE array orientation | $\Omega_{UT,\alpha}$ uniformly distributed on [0.360] degree, $\Omega_{UT,\beta}$ = 90 degree, $\Omega_{UT,\gamma}$ = 0 degree |
| UE antenna pattern | Isotropic antenna gain pattern A'(θ', φ') = 1 |
| Traffic model | FTP Model 1 with packet size 0.5 Mbytes (low ~20% RU, medium ~50% RU, high ~70% RU) [7] |
| Scheduler | Frequency selective scheduling (multiple UEs per TTI allowed) |
| Receiver | Non-ideal channel estimation and interference modeling, detailed guidelines according to Rel-12 [71-12] assumptions<br>LMMSE-IRC receiver, detailed guidelines according to Rel-12 [71-12] assumptions |
| CSI-RS, CRS | CSI-RS port is mapped to all TXRUs corresponding to one column of co-polarized antenna elements, CRS port 0 is associated with the first column with +45 degree pol, and CRS port 0 is mapped to the first TXRU. |
| Hybrid ARQ | Maximum 4 transmissions |
| Feedback | PUSCH 3-2<br>CQI, PMI and RI reporting triggered per 5 ms<br>Feedback delay is 5 ms<br>Rel-8 4Tx codebook for horizontal PMI feedback |
| Overhead | 3 symbols for DL CCHs, 2 CRS ports and DM-RS with 12 REs per PRB. CSI-RS overhead is described in Table 1. |
| Transmission scheme | TM10, single CSI process, dynamic SU/MU-MIMO with rank adaptation (no CoMP) |
| Wrapping method | Geographical distance based |
| Handover margin | 3 dB |
| Metrics | Average UE throughput, 5% UE throughput, 50% UE throughput. |

Next, referring to the contents of approach 1 to approach 3 described above, the CSI process and the CSI-RS configuration for supporting EBF/FD-MIMO will be described in more detail.

The following description includes an enhancement in the schemes based on non-precoded and beamformed CSI-RS, and this influences on the CSI process and the CSI-RS configuration for supporting EBF/FD-MIMO.

For the scheme based on non-precoded CSI-RS, it is required that a new type of a CSI-RS resource including total 12 port or 16 port in a single CSI process is defined such that a UE measures such CSI-RS ports and reports the corresponding FD-MIMO CSI feedback.

For the scheme based on beamformed CSI-RS, approaches 1 to 3 for allocating beamformed CSI-RS resource(s) have been described.

The description in relation to approach 1 to approach 3 is referred to the description above.

Hereinafter, the schemes based on non-precoded CSI-RS and the schemes based on beamformed CSI-RS will be described briefly below.

Non-Precoded CSI-RS Based Schemes

First, the schemes based on non-precoded CSI-RS are described.

The existing CSI process definition includes the combination of a single NZP CSI-RS resource and a single CSI-IM resource for a CSI measurement of a UE.

Here, the legacy NZP CSI-RS resource may have {1, 2, 4, or 8} CSI-RS antenna ports in the corresponding configuration.

In order to support the FD-MIMO including 12 port or 16 port CSI-RS in Rel-13, it is required that merge of a plurality of legacy NZP CSI-RS resources or design of new NZP CSI-RS resource is supported in a single CSI process.

The former option (merge of a plurality of legacy NZP CSI-RS resources) has an advantage of network flexibility in configuring total 2 ports or 16 ports NZP CSI-RS in a single CSI process, and this is because a plurality of legacy NZP CSI-RS resources may be freely configured in a CSI process in the aspect of time/frequency resource allocation.

On the contrary, the former option requires more complexity in a UE operation in the fact that the UE implements all available combination of the legacy NZP CSI-RS resource, and also requires increased channel measurement complexity.

Next, the latter option (design of new NZP CSI-RS resource) has an advantage of lower UE complexity than the former option, but has lower network flexibility in configuring 12 port or 16 port NZP CSI-RS in a single CSI process.

Because of the aspect that the UE complexity is more important, it may be more preferable to follow the latter option.

Otherwise, in the case of considering the aspect of future extension, the former option which is more flexible may be taken, but in this case, there are a few restrictions in a network configuration.

(Proposal 1): In order to support 12 port and 16 port CSI-RS in a single CSI process, the configuration flexibility should be strictly restricted to a pair of available CSI-RS patterns; each of the available CSI-RS patterns includes a plurality of legacy CSI-RS resources.

Beamformed CSI-RS Based Schemes

Next, the schemes based on beamformed CSI-RS will be described.

In the aspect of a UE complexity, the schemes based on beamformed CSI-RS has an advantage that the number of NZP CSI-RS ports that should be measured for obtaining CSI (derivation) may be maintained like the legacy schemes.

That is, up to eight NZP CSI-RS ports may be sufficient due to the beamforming weights which are applied in a transmitted NZP CSI-RS in advance.

Therefore, although 12 port or 16 port beamformed CSI-RS transmission may be used for the case that an eNB implements a large number of transmission antennas for the future extension, the enhancement of the 12 port and 16 port CSI-RS patterns described above may not be required for the FD-MIMO scheme based on beamformed CSI-RS.

In the aspect of the schemes based on beamformed CSI-RS, the enhancements required in the CSI process that includes NZP CSI-RS resources are dependent upon each of the approach methods (approach 1 to approach 3) described above.

With respect to approach 1 that uses a UE-dedicated CSI-RS resource allocation, the NZP CSI-RS periodically transmitted which is configured in a single CSI process may be applied so as to diversify adaptively the beamforming coefficient which is fit perfectly to a UE channel direction in each CSI-RS transmission time instance.

This is because the NZP CSI-RS resource is allocated to a UE dedicatedly.

In the case that such a variation of the beamforming coefficient is not frequently occurred, even in the case that the UE should not know the accurate beamforming coefficients applied to the NZP CSI-RS, it is beneficial that the applied beamforming coefficients configures properly a CSI measurement window for obtaining CSI or a UE may know whether to reset or modify it.

(Observation 1): In order for a UE to reset a starting time of a CSI measurement window, an accurate beam change indication from an eNB is supported for approach 1 that uses the UE-dedicated beamformed CSI-RS resource allocation.

Approach 2 that uses M beamformed CSI-RS resources that are fixed in cell-specific manner may be more beneficial than approach 2 that has many CSI-RS overheads when the number of UEs operating in a cell increases.

Generally, a specific cell may predetermine a plurality of candidate beamformed CSI-RS resources (e.g., 2, 4, or 8). This is because many UEs that prefer different beam directions may be existed in cell coverage.

In this case, a UE may be indicated to measure N=1 CSI-RS from total candidate M beamformed CSI-RS resources, and the corresponding CSI-RS process configuration includes M CSI-RS resource configurations.

Even in the case that such a CSI process includes a plurality of M CSI-RS resources, such a configuration is required to be distinguished from the indication in a use for the case based on non-precoded CSI-RS as described above.

When it is discovered that preferred N CSI-RS resources are changed based on a CSI-RSRP report, and the like of a UE in M candidate beamformed resources, it is required for the UE able to know a valid CSI-RS resource change for a CSI measurement in a CSI process.

In the case that a part of candidate beamformed CSI-RSs is not required to be transmitted in the cell aspect, for example, since there is no UE that prefers the corresponding vertical beam direction, such CSI-RS resources may be flexibly used for a data transmission by a dynamic ZP CSI-RS indication for securing a performance gain.

(Observation 2) It is required that a dynamic ZP CSI-RS indication is supported by approach 2 and approach 2 based on beamformed CSI-RS in order to secure an important performance by saving CSI-RS overhead.

Approach 3 that uses the aperiodic beamformed CSI-RS transmission is the best method of combining all of the advantages of approach 1 and approach 2, and approach 3 does not depend on the UE-dedicated CSI-RS allocation like approach 1 (a method of using CSI-RS resource pooling for a plurality of UEs in a cell), but the beamforming coefficients (in comparison with the CSI-RS resource which is fixed in a cell-specific manner, as in approach 2) may be flexibly changed in the same NZP CSI-RS resource.

With respect to such an approach (approach 3), in the corresponding CSI-RS process configuration, an indication may be required for a UE that may not measure the NZP CSI-RS which is configured in all transmission instances always, and the measurement instance for the configured NZP CSI-RS resource may be indicated dynamically by an eNB.

Such a dynamic indication may be in relation to a CSI request field of a UE-related DCI, and the corresponding aperiodic CSI reporting may be used together with approach 3 that implements the aperiodic beamformed CSI-RS transmission.

Approach 3 that uses the aperiodic beamformed transmission shows the best performance in a system-level simulation. The important factor of such a performance gain is owing to the CSI-RS overhead saving, and in the case of not required to transmit aperiodic CSI-RS, the corresponding CSI-RS REs are released so as to be reused for a PDSCH transmission. For this, it is required that a dynamic ZP CSI-RS indication is supported.

(Observation 3): Approach 3 that uses the aperiodic beamformed transmission shows the best performance since a CSI-RS overhead is efficiently controlled and CSI-RS REs are reused for a PDSCH transmission.

(Proposal 2) The aperiodic beamformed CSI-RS transmission schemes should be supported in Rel-13 based on the best performance that has an important gain.

Hereinafter, the matters in relation to the dynamic ZP CSI-RS indication for supporting the scheme based on beamformed CSI-RS described above will be described in detail.

The dynamic ZP CSI-RS indication is designed for reusing unused CSI-RS REs as PDSCH REs in the case that there is no indication of actual aperiodic CSI-RS transmission, and the dynamic ZP CSI-RS configuration may be defined for a proper PDSCH rate matching.

Before describing the dynamic ZP CSI-RS indication, a PDSCH resource mapping method in relation to a ZP CSI-RS of a PQI field included in DCI format 2D is briefly described first.

One of DCI formats in relation to TM 10 is DCI format 2D, and the DCI format 2D includes a PQI field.

The PDSCH RE Mapping and Quasi-Co-Location Indicator (PQI) field is a parameter in relation to PDSCH resource mapping, and may be defined as Table 11 below.

TABLE 11

| Value of 'PDSCH RE Mapping and Quasi-Co-Location Indicator(PQI)' field | Description |
|---|---|
| '00' | Parameter set 1 configured by higher layers |
| '01' | Parameter set 2 configured by higher layers |
| '10' | Parameter set 3 configured by higher layers |
| '11' | Parameter set 4 configured by higher layers |

Maximum four parameter sets may be set to a UE set to TM 10 with respect to a given serving cell by a higher layer signaling in order to decode a PDSCH according to PDCCH/EPDCCH of DCI format 2D which is detected.

The UE may use the parameter set according to the PQI field value represented in Table 11 above in order to determine PDSCH RE mapping and PDSCH antenna port quasi co-location.

In this case, the UE is set to Type B quasi co-location type.

In addition, in order to determine the PDSCH RE mapping and PDSCH antenna port quasi co-location, the following parameters (according to PQI field value) are set through a higher layer signaling for each parameter set.
  crs-PortsCount-r11
  crs-FreqShift-r11
  mbsfn-SubframeConfigList-r11
  csi-RS-ConfigZPId-r11
  pdsch-Start-r11
  qcl-CSI-RS-ConfigNZPId-r11
  zeroTxPowerCSI-RS2-r12(if the UE is configured with higher layer parameter eMIMO-Type for TDD serving cell)

Table 12 below represents an example of CSI-RS-ConfigNZP information element, and Table 13 below represents an example of CSI-RS-ConfigZP information element. Table 14 below represents an example of CSI-RS-ConfigZPId information element.

The CSI-RS-ConfigNZP information element represents a CSI-RS resource configuration that an E-UTRAN may set in a serving frequency when a UE assumes non-zero transmission power.

In addition, the CSI-RS-ConfigZPId information element is used for identifying a CSI-RS resource configuration when a UE assumes zero transmission power.

TABLE 14

```
-- ASN1START
CSI-RS-ConfigZPId-r11 ::=          INTEGER (1..maxCSI-RS-ZP-r11)
-- ASN1STOP
```

First Embodiment

A first embodiment provides a definition for a dynamic ZP CSI-RS indication and a method for transmitting it proposed in the present disclosure.

In order to define the dynamic ZP CSI-RS indication, a new field of N bits may be added to a specific DCI format.

Here, the specific DCI format may be DCI format 2D existed conventionally, and may also be a new DCI format

TABLE 12

```
-- ASN1START
CSI-RS-ConfigNZP-r11 ::=   SEQUENCE {
    csi-RS-ConfigNZPId-r11         CSI-RS-ConfigNZPId-r11,
    antennaPortsCount-r11          ENUMERATED {an1, an2, an4, an8},
    resourceConfig-r11             INTEGER (0..31),
    subframeConfig-r11             INTEGER (0..154),
    scramblingIdentity-r11         INTEGER (0..503),
    qcl-CRS-Info-r11               SEQUENCE {
        qcl-ScramblingIdentity-r11     INTEGER (0..503),
        crs-PortsCount-r11             ENUMERATED {n1, n2, n4, spare1},
        mbsfn-SubframeConfigList-r11   CHOICE {
            release                        NULL,
            setup                          SEQUENCE {
                subframeConfigList             MBSFN SubframeConfigList
            }
        }                                                                       OPTIONAL   -- Need ON
    }                                                                           OPTIONAL   -- Need OR
    ...
    [[  csi-RS-ConfigNZPId-v1310    CSI-RS-ConfigNZPId-v1310    OPTIONAL        -- Need ON
    ]]
}
CSI-RS-ConfigNZP-EMIMO-r13 ::=   CHOICE {
    release                        NULL,
    setup                          SEQUENCE {
        nzp-resourceConfigList-r13     SEQUENCE (SIZE (1..2)) OF NZP-ResourceConfig-r13,
        cdmType-r13                    ENUMERATED {cdm2, cdm4} OPTIONAL         -- Need OR
    }
}
NZP-ResourceConfig-r13 ::=   SEQUENCE {
    resourceConfig-r13             ResourceConfig-r13,
    ...
}
ResourceConfig-r13 ::=       INTEGER (0..31)
-- ASN1STOP
```

The CSI-RS-ConfigZP information element represents a CSI-RS resource configuration that an E-UTRAN may set in a serving frequency when a UE assumes zero transmission power.

TABLE 13

```
-- ASN1START
CSI-RS-ConfigZP-r11 ::=    SEQUENCE {
    csi-RS-ConfigZPId-r11          CSI-RS-ConfigZPId-r11,
    resourceConfigList-r11         BIT STRING (SIZE (16)),
    subframeConfig-r11             INTEGER (0..154),
    ...
}
-- ASN1STOP
```

(e.g., DCI format 2E) defined by a new Transmission Mode (TM), but hereinafter, defines a new field for the dynamic ZP CSI-RS indication in a new DCI format, for example.

In addition, hereinafter, the new field for the dynamic ZP CSI-RS indication is represented as 'dynamic ZP CSI-RS indication field' briefly.

For example, in the case that the number of bits of the new field defined for the dynamic ZP CSI-RS indication is 2 (N=2), dynamic indication among total four states of 00, 01, 10 and 11 may be performed.

Here, the description for each state may be given to a UE through an RRC signaling in advance (as the same or similar to Table 11).

In this case, a few candidate ZP CSI-RS configurations for the purpose of approach 3, and the like described above may be RRC-configured by being interlinked with the dynamic state.

As described above, in the case that a new TM (e.g., TM 11) for FD-MIMO is defined, it may be assumed that the TM-dependent DCI in this case is 'DCI format 2E'.

The Full-Dimension (FD)-MIMO used in the present disclosure means a MIMO supported in 3GPP rel-13 (or after rel-13), and may be referred to or called variously enhanced MIMO, massive MIMO, and the like.

In this case, DCI format 2E may be in a form in which at least one new field is included for the dynamic ZP CSI-RS indication additionally to the information included in DCI format 2D.

The DCI format 2D may further include a carrier indication field, a resource allocation header field, a resource block assignment field, a TPC command field for a PUCCH, a downlink allocation index field, a HARQ process number field, an SRS request field, a HARQ-ACK resource offset field, and so on in addition to the PQI field.

Here, since DCI format 2D already includes the ZP CSI-RS indication configuration in the PQI field and a state of each PQI field, DCI format 2E also includes the ZP CSI-RS indication configuration in the PQI field and a state of each PQI field.

Second Embodiment

In the case that the PQI field already included in DCI format 2E and new field for the dynamic ZP CSI-RS indication defined in the first embodiment are existed together in DCI format 2E, a second embodiment provides a clear operation method therefor.

Hereinafter, various examples of the clear operation method will be described, and at least one of them may be applied for the clear operation method.

(Method 1): Define the PQI field so as to be optionally configured in DCI format 2E in relation to TM 11.

DCI format 2D of the existing TM 10 includes the PQI field as mandatory, but DCI format 2E of TM 11 described in the first embodiment defines to include a PQI field as optional.

And, the dynamic ZP CSI-RS indication field is defined to be included in DCI format 2E as mandatory.

(Method 2): Define the dynamic ZP CSI-RS indication field to be included as optional like the PQI field in DCI format 2E, and defines whether to include it is set by network configurability.

In the case that the PQI field is not included in DCI format 2E but the dynamic ZP CSI-RS indication field only is included, a configuration for ZP-CSI-RS is applied according to the dynamic ZP CSI-RS indication field included in DCI format 2E, and PDSCH RE mapping is performed.

In the case that both of the PQI field and the dynamic ZP CSI-RS indication field are included in DCI format 2E, it is interpreted that it is intended to perform the operation of approach 3 described above while CoMP operation is performed.

Accordingly, in this case, it is defined such that the ZP CSI-RS configuration part only is disregarded among the information indicated in the PQI field included in DCI format 2E, and PDSCH rate matching is performed according to the dynamic ZP CSI-RS indication field included in DCI format 2E.

That is, when PDSCH rate matching is performed, the dynamic ZP CSI-RS indication field has higher priority than the ZP CSI-RS configuration indicated in the PQI field included in DCI format 2E.

(Method 3): ZP-CSI-RS indication of more candidates is performed in a joint encoding form of the separate ZP-CSI-RS indication field additionally included in DCI format 2E with the ZP-CSI-RS indicator indicated in the PQI field included in DCI format 2E.

That is, in the case that the PQI field and the dynamic ZP CSI-RS indication field are included together in DCI format 2E, an RRC description therefor is joint encoded together with four states in the PQI field and four states in the dynamic ZP CSI-RS indication field, and accordingly, method 3 is a method for performing the dynamic ZP CSI-RS indication that corresponds to total 16 states.

FIG. 20 is a flowchart illustrating an example of aperiodic transmission and reception method of beamformed CSI-RS proposed in the present disclosure.

The CSI-RS reporting related type based on non-precoded used in the present disclosure may be represented as 'class A' and the CSI-RS reporting related type based on beamformed may be represented as 'class B'.

First, a UE receives a higher layer signaling including resource configuration information in relation to an aperiodic transmission of beamformed CSI-RS from an eNB (step, S2010).

The higher layer signaling may be Non Zero Power (NZP) CSI-RS configuration information.

In addition, the resource configuration information in relation to an aperiodic transmission of beamformed CSI-RS may not include subframeConfig field in relation to the subframe in which CSI-RS is transmitted.

Furthermore, the resource configuration information in relation to a periodic transmission of beamformed CSI-RS and the resource configuration information in relation to beamformed aperiodic transmission may be distinguished by CSI-RS ConfigNZPId field included in the higher layer signaling.

That is, the resource configuration information in relation to a periodic transmission and the resource configuration information in relation to an aperiodic transmission may have different NZP CSI-RS ID values, respectively.

Later, the UE receives a first downlink control information (DCI) format including first control information notifying that there is an aperiodic transmission of the beamformed CSI-RS from the eNB (step, S2020).

The first control information may be an aperiodic CSI request field.

Later, the UE measures the beamformed CSI-RS based on the received resource configuration information (step, S2030).

Then, the UE reports a measurement result of the beamformed CSI-RS to the eNB (step, S2040).

In addition, the UE receives a second DCI format including information in relation to Physical Downlink Shared Channel (PDSCH) resource mapping from the eNB.

Here, the second DCI format may further include at least one of PDSCH RE Mapping and Quasi-Co-Location Indicator (PQI) field or dynamic Zero Power (ZP) CSI-RS indication field.

In addition, the dynamic ZP CSI-RS indication field includes a resource region that is available to be used for PDSCH transmission additionally owing to the situation that an aperiodic transmission of the beamformed CSI-RS does not occur.

In the case that the second DCI format includes either one of the PQI field or the dynamic ZP CSI-RS indication field, the PDSCH resource mapping may be performed based on any one field included in the second DCI format.

In the case that the second DCI format includes both of the PQI field and the dynamic ZP CSI-RS indication field, the PDSCH resource mapping may be performed based on the dynamic ZP CSI-RS indication field.

The second DCI format may be a DCI format in relation to a Transmission Mode (TM) which is defined for supporting a transmission of beamformed CSI-RS.

Here, the dynamic ZP CSI-RS indication field may be represented as 2 bits, and may have a value of '00', '01', '10' and '11'.

The dynamic ZP CSI-RS indication field may represent a parameter set configured by higher layer signaling in order to determine PDSCH resource mapping.

The procedure of the UE to receive the second DCI format may be performed later or before step S2040.

After receiving the second DCI format, the UE receives a PDSCH based on the received second DCI format from the eNB.

General Apparatus to which the Present Invention May be Applied

FIG. 21 illustrates a block diagram of a wireless communication apparatus according to an embodiment of the present invention.

Referring to FIG. 21, the wireless communication system includes a base station (eNB) 2110 and a plurality of user equipments (UEs) 2120 located within the region of the eNB 2110.

The eNB 2110 includes a processor 2111, a memory 2112 and a radio frequency (RF) unit 2113. The processor 2111 implements the functions, processes and/or methods proposed in FIGS. 1 to 20 above. The layers of wireless interface protocol may be implemented by the processor 2111. The memory 2112 is connected to the processor 2111, and stores various types of information for driving the processor 2111. The RF unit 2113 is connected to the processor 2111, and transmits and/or receives radio signals.

The UE 2120 includes a processor 2121, a memory 2122 and an RF unit 2123. The processor 2121 implements the functions, processes and/or methods proposed in FIGS. 1 to 20 above. The layers of wireless interface protocol may be implemented by the processor 2121. The memory 2122 is connected to the processor 2121, and stores various types of information for driving the processor 2121. The RF unit 2123 is connected to the processor 2121, and transmits and/or receives radio signals.

The memories 2112 and 2122 may be located interior or exterior of the processors 2111 and 2121, and may be connected to the processors 2111 and 2121 with well known means. In addition, the eNB 2110 and/or the UE 2120 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The operation method in relation to CSI-RS performed by a UE in a wireless communication system of the present invention has been described mainly with the example applied to 3GPP LTE/LTE-A system, but may also be applied to various wireless communication systems except the 3GPP LTE/LTE-A system.

The invention claimed is:

1. A method for receiving, by a user equipment (UE), a data on a physical downlink shared channel (PDSCH) in a wireless communication system, the method comprising:
    receiving, from a base station (BS), a higher layer signaling including resource configuration information related to an aperiodic transmission of a channel state information-reference signal (CSI-RS);
    receiving, from the BS, a downlink control information (DCI) format including information related to a PDSCH resource mapping;
    determining, by the UE, a resource mapping for the PDSCH based on the DCI format; and
    receiving, from the BS, the data on the PDSCH.

2. The method of claim 1, wherein the information related to the PDSCH resource mapping is a dynamic zero power (ZP) CSI-RS indication field.

3. The method of claim 2, wherein the dynamic ZP CSI-RS indication field includes a resource region that is available to be used for PDSCH transmission in a situation when the aperiodic transmission of the CSI-RS does not occur.

4. The method of claim 1, wherein the DCI format further includes a PDSCH resource element mapping and quasi-co-location indicator (PQI) field.

5. The method of claim 4, wherein the PDSCH resource mapping is performed based on the PQI field or the information related to the PDSCH resource mapping.

6. The method of claim 1, wherein the DCI format is a DCI format related to a transmission mode (TM) which is defined for supporting a transmission of the CSI-RS.

7. The method of claim 1, wherein the information related to the PDSCH resource mapping is represented as 2 bits.

8. The method of claim 1, wherein the information related to the PDSCH resource mapping represents a parameter set configured by the higher layer signaling in order to determine the PDSCH resource mapping.

9. A user equipment (UE) for receiving a data on a physical downlink shared channel (PDSCH) in a wireless communication system, the UE comprising:
- a a receiver; and
- a processor, functionally connected to the receiver, wherein the processor is configured to:
- control the receiver to receive, from a base station (BS), a higher layer signaling including resource configuration information related to an aperiodic transmission of a channel state information-reference signal (CSI-RS);
- control the receiver to receive, from the BS, a downlink control information (DCI) format including information related to a PDSCH resource mapping;
- determine, by the UE, a resource mapping for the PDSCH based on the DCI format; and
- control the receiver to receive, from the BS, the data on the PDSCH.

10. The UE of claim 9, wherein the information related to the PDSCH resource mapping is a dynamic zero power (ZP) CSI-RS indication field.

* * * * *